(12) United States Patent
Lavi et al.

(10) Patent No.: US 8,020,328 B2
(45) Date of Patent: Sep. 20, 2011

(54) CONNECTING ELEMENTS FOR CONSTRUCTION

(76) Inventors: Erez Lavi, Kiryat Motzkin (IL); Gal Indyk, Kiryat Tivon (IL)

( * ) Notice: Subject to any disclaimer, the term of this patent is extended or adjusted under 35 U.S.C. 154(b) by 280 days.

(21) Appl. No.: 11/941,560

(22) Filed: Nov. 16, 2007

(65) Prior Publication Data

US 2008/0224470 A1 Sep. 18, 2008

Related U.S. Application Data

(63) Continuation-in-part of application No. PCT/IL2006/000580, filed on May 17, 2006.

(60) Provisional application No. 60/681,687, filed on May 17, 2005.

(51) Int. Cl.
*G09F 7/00* (2006.01)

(52) U.S. Cl. ............................................. 40/605; 40/610

(58) Field of Classification Search .................... 40/604, 40/605, 606.17, 782, 610; 403/169, 171, 403/176; 446/127; 52/81.3, 656.9
See application file for complete search history.

(56) References Cited

U.S. PATENT DOCUMENTS

| | | | | |
|---|---|---|---|---|
| 1,130,324 A * | 3/1915 | Owen | ........................... | 446/127 |
| 1,985,992 A * | 1/1935 | Hayman | ....................... | 446/122 |
| D214,745 S * | 7/1969 | Walker | ......................... | D21/488 |
| 3,552,817 A * | 1/1971 | Marcolongo | ................ | 312/107 |
| 4,129,975 A * | 12/1978 | Gabriel | ....................... | 52/655.2 |
| 4,326,354 A * | 4/1982 | Hagberg | ....................... | 446/126 |
| 4,652,170 A * | 3/1987 | Lew | ................. | 403/381 |
| 4,787,191 A * | 11/1988 | Shima | ......................... | 52/655.2 |
| 4,888,895 A * | 12/1989 | Kemeny | ........................... | 40/610 |
| 4,907,907 A * | 3/1990 | Kreusel | ...................... | 403/171 |
| 4,951,440 A | 8/1990 | Staeger | | |
| 5,051,019 A * | 9/1991 | Kohl | ............................. | 403/171 |
| 5,127,758 A * | 7/1992 | Kreusel | ........................ | 403/171 |
| 5,356,234 A | 10/1994 | Vangool | | |
| 5,802,798 A | 9/1998 | Martens | | |
| 5,839,248 A * | 11/1998 | Liang | .......................... | 52/655.2 |
| 6,622,447 B1 * | 9/2003 | Kessler | ....................... | 52/655.2 |
| 2006/0278777 A1 * | 12/2006 | Atkinson et al. | .......... | 248/188.4 |

FOREIGN PATENT DOCUMENTS

DE 3620379 12/1987

* cited by examiner

*Primary Examiner* — Joanne Silbermann
*Assistant Examiner* — Christopher E Veraa
(74) *Attorney, Agent, or Firm* — William H. Dippert; Eckert Seamans Cherin & Mellott, LLC

(57) ABSTRACT

New and unique connecting elements are engage in a versatile manner to construct modular constructions such as construction for exhibition, furniture, platforms, toys, displays etc. The modular construction is mobile and easy to handle.

11 Claims, 22 Drawing Sheets

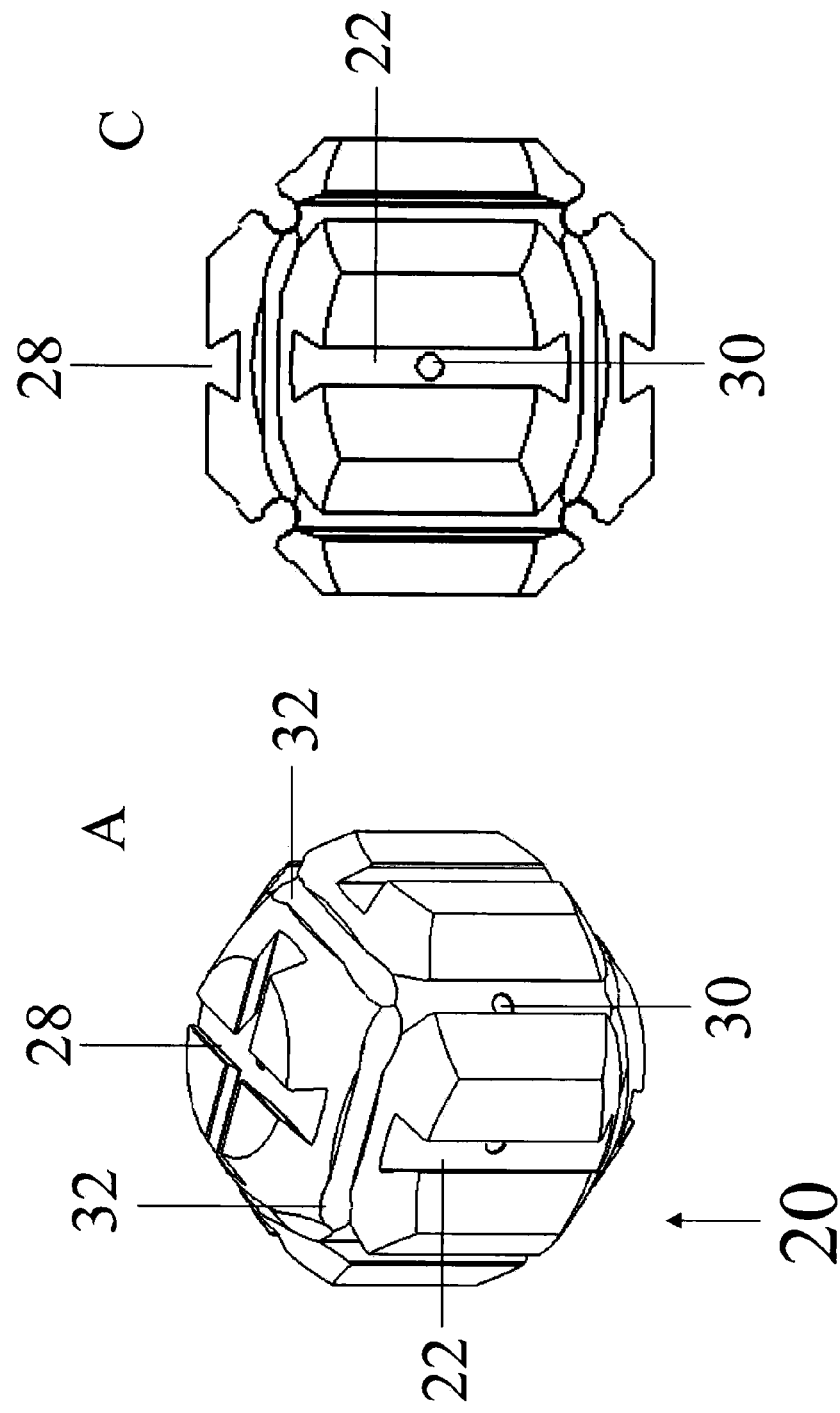

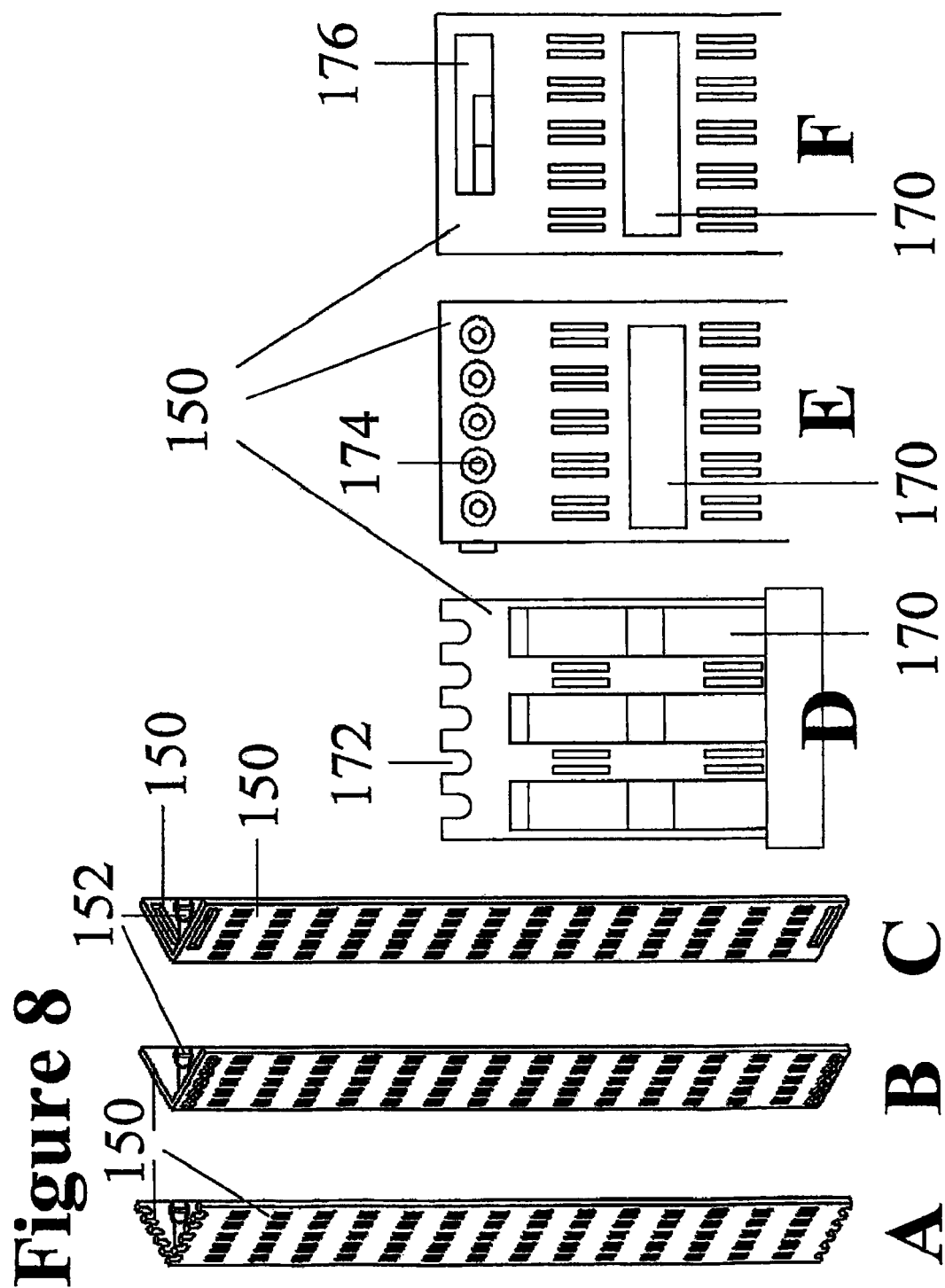

CONNECTING ELEMENTS FOR CONSTRUCTION

FIELD OF THE INVENTION

The present invention relates to connecting elements for constructions and modular constructions. More particularly, the present invention relates to variety of constructions such as table, chairs, stages, platform, displays, counters, furniture in general, toys and other suitable modular construction.

The present application claims the benefit of earlier U.S. provisional patent application Ser. No. 60/681687 filed on 17 of May 2005 entitled "Mobile and versatile exhibition" and is a continuation-in-part of PCT application Ser. No. PCT/IL2006/000580 filed on 17 of May 2006 entitled "Connecting elements for construction".

BACKGROUND OF THE INVENTION

Modular furniture is needed in exhibitions. In the exhibition industry, there are three groups of exhibition wherein the first group is especially built exhibition, meaning, built exhibition out of metal, plastic, wood, or calcium sulfate. One disadvantage of this option is the necessity in professionals to build it. Moreover, it carries out a complex logistic and high cost. Moreover, it is in all known prior art that the construction is visible as frames surrounding the panels even after the panels are attached. The second group is an easy to carry mobile kits. It's easy to build and comprises few parts, where the parts are provided in a fixed size and shape that limit the customer's creativeness in his exhibitions. Another group is the modular kits. Those kits are made of heavy materials and they allow the customer several exhibition possibilities; however, professional work and logistic costs are still needed in building up the exhibition. An example of such kits is manufactured by Nimlok Ltd.

In the need of modular furniture, the aspect of modular exhibition as evolved by the inventors of the present invention was implemented to furniture and other constructions.

SUMMARY OF THE INVENTION

It is an object of the present invention to provide modular structures suitable for different purposes and uses.

It is another object of the present invention to provide modular structures that can form different shapes.

It is another object of the present invention to provide an exhibition in which the construction is completely hidden behind the media panel, that in respect with all surfaces: interior and exterior corners, angles and straight surfaces.

Therefore and in accordance with a preferred embodiment of the present invention, it is provided connecting elements adapted to form constructions comprising:

plurality of connectors having plurality of faces, wherein each of said plurality of faces is provided with a slot having two opposite side openings and an elongated opening;

plurality of connecting rods having two ends wherein an engagement means is provided to at least one of said two ends and wherein said engagement means is provided with an engagement head adapted to move solely in sliding movements within said slot and wherein said engagement head cannot pass through said elongated opening;

whereby said plurality of connectors act as detachable junctions between said plurality of connecting rods and constructions can be built up from said plurality of connecting rods.

Furthermore and in accordance with another preferred embodiment of the present invention, it is provided a mobile and versatile exhibition construction comprising:

plurality of connecting rods having two ends wherein an engagement means is provided to at least one of said two ends and wherein said engagement means is provided with an engagement head;

plurality of connectors having plurality of faces, wherein each of said plurality of faces is provided with a slot having two opposite openings and an elongated opening wherein said engagement head is adapted to move solely in sliding movements within said slot and wherein said engagement head cannot pass through said elongated opening;

plurality of wing connecting members comprises at least one elongated surface and a connected gripper adapted to grip one of said plurality of connecting rods;

plurality of panels adapted to contiguously connect to said plurality of wing connecting members.

BRIEF DESCRIPTION OF THE FIGURES

In order to better understand the present invention and appreciate its practical applications, the following Figures are attached and referenced herein. Like components are denoted by like reference numerals.

It should be noted that the figures are given as examples and preferred embodiments only and in no way limit the scope of the present invention as defined in the appending Description and Claims.

DETAILED DESCRIPTION OF THE INVENTION AND FIGURES

The present invention provides new and unique connecting elements adapted to engage to one another in a versatile manner to construct modular constructions. The immediate implementation of such a construction and the exemplary embodiment shown in the description herein is exhibition construction. The use of the connecting elements of the present invention allows to easily build up an exhibition booth that should be mobile, versatile and easy to construct. One of the main features of the connecting elements is the design of the supporting rod to act as an axle as well as a construction element that opens up enormous possibilities to design a construction out of the few building blocks of the present invention.

Figure 1:
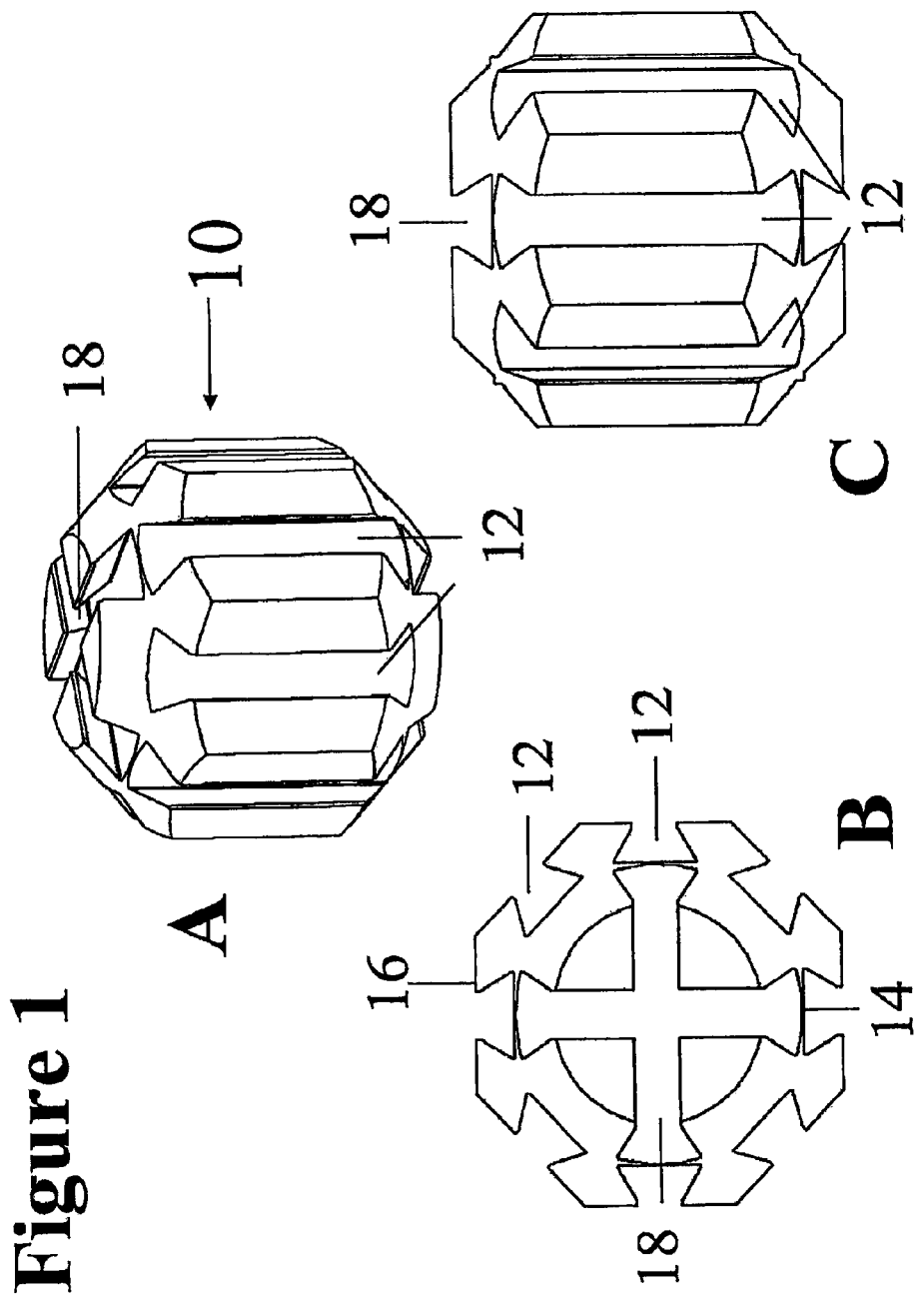
FIGS. 1a-c illustrate different views of a decahedron connector in accordance with a preferred embodiment of the present invention.

Reference is now made to FIGS. 1a-c illustrating different views of a decahedron connector in accordance with a preferred embodiment of the present invention, an isometric view, a top view, and a side view, respectively. A decahedron connector 10 is built of ten sides—eight sides are arranged in a substantially circular manner (shown clearly in FIG. 1b, which is a top view) and additional two faces; an upper face and a bottom face are provided. Each side of the substantially circular circumference is provided with a slot 12. Each of slots 12 is open on three sides, two opposite sides on both ends of the slot and an elongated opening along the slot. The slots are having a profile (clearly seen in FIG. 1b) that is broaden in the interior side 14 of the slot and narrower in the outer side 16, the side of the elongated opening. When a corresponding element having a corresponding profile is being inserted into slot 12 through one of the two opposite ends of the slot, it cannot be pulled out by a pulling movement through the elongated opening which is the narrower side of the slot. It can be inserted and pulled out from the slot only by a sliding movement through one of both ends of the slot.

The upper and the bottom sides of decahedron connector 10 are provided also with slots and each preferably provided with two crossed slots 18. The slots are basically similar to slots 12 of the sides; however, since the upper and the bottom faces has a larger surface than any of the other sides, there is a possibility to place crossed slots that broadens the modularity of the connector.

It should be mentioned that the decahedron shaped connector is solely an example for the connector of the present invention. The connector can be built of any number of faces and sides that renders modularity to the connector.

Figure 2:
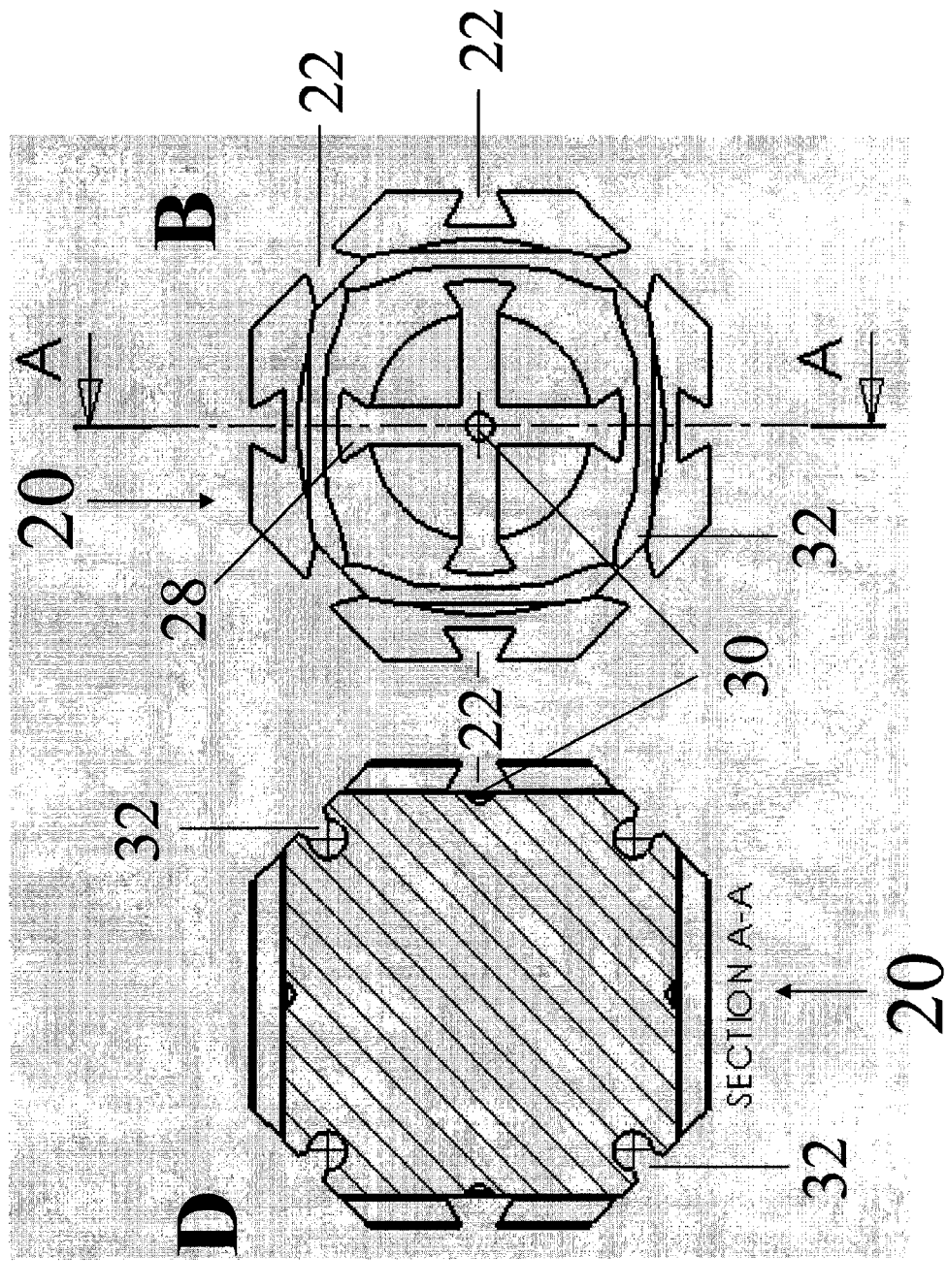
FIGS. 2a-d illustrate different views of a decahedron connector in accordance with another preferred embodiment of the present invention.

Reference is now made to FIG. 2 illustrating different views of a decahedron connector in accordance with another preferred embodiment of the present invention; an isometric view, a top view, a side view, and a cross sectional view, respectively. A decahedron connector 20 is built of ten sides—eight sides are arranged in a substantially circular manner (shown clearly in FIG. 2b, which is a top view) and additional two faces; an upper face and a bottom face are provided. Each side of the substantially circular circumference is provided with a slot 22. Each of slots 22 is open on three sides, similarly to slots 12 and is provided with similar profiles. When a corresponding element having a corresponding profile is being inserted into slot 22 through one of the two opposite ends of the slot, it cannot be pulled out by a pulling movement through the elongated opening which is the narrower side of the slot. It can be inserted and pulled out from the slot only by a sliding movement through one of both ends of the slot.

The upper and the bottom sides of decahedron connector 20 are provided also with slots and each preferably provided with two crossed slots 28.

Each of slots 22 or 28 are provided with a recess 30 adapted to receive a corresponding protrusion of a corresponding element (the corresponding element is not shown in these figures; will be shown herein after) and act as a locking mechanism preventing undesired sliding of the element within the slot.

Additional eight slots 32 are provided between the sides of the circular circumference and the upper and the bottom faces. Those features are clearly shown in FIG. 2a, which is the isometric view, and FIG. 2d, which is a sectional view of an A-A section shown in FIG. 2b. Slots 32 preferably have a rounded profile; however are functioning in the same manner as slots 22 and 28 by the fact that corresponding elements may only be slidably inserted to within the slot that grips the corresponding element so that it cannot be pulled out by a pulling force.

Additional slots 32 renders decahedron connector with additional connecting angles as will be shown herein after that even increases the modularity feature of the construction that can be built by the connector elements of the present invention.

It should be mentioned that slots 22 or 32 can be designed in any other profile as long as the corresponding connected element is adapted to laterally slide within the slot and not be pulled outwardly through the elongated opening of the slot.

Figure 3:
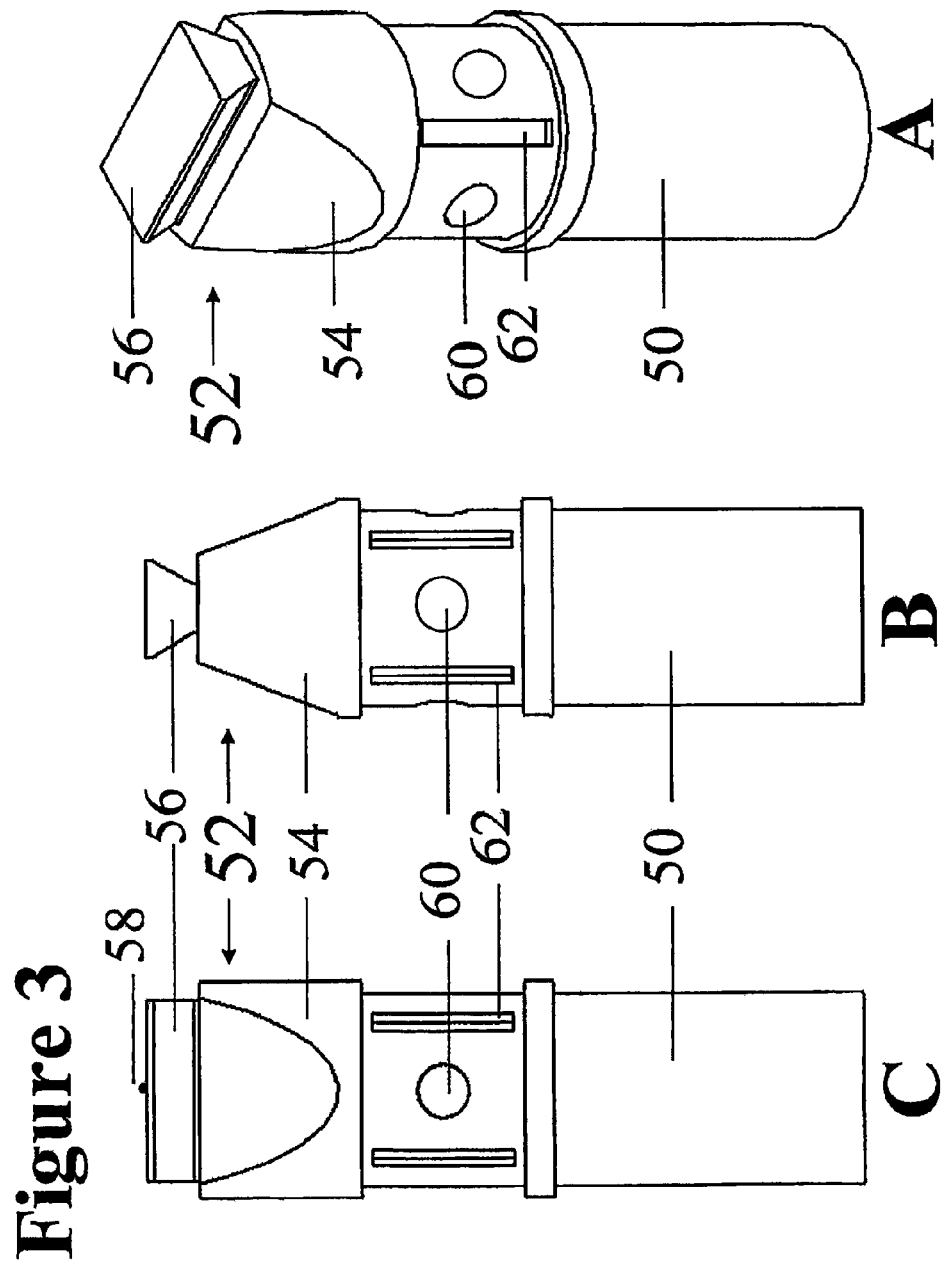
FIGS. 3a-c illustrate different views of a supporting rod's engagement means corresponding to a decahedron connector in accordance with a preferred embodiment of the present invention.

Reference is now made to FIG. 3 illustrating different views of a supporting rod's engagement means corresponding to a decahedron n connector in accordance with a preferred embodiment of the present invention. FIG. 3a is an isometric view and FIGS. 3b and c are side views from different angles. As mentioned herein before, corresponding elements are adapted to be connected to the decahedron connectors. Supporting rods 50 are preferably provided from both sides of the rod with engagement means 52. Engagement means 52 comprises a base 54 onto which an engaging head 56 is provided. Engaging head 56 has a profile that matches the profile of slots 12 and 18 of decahedron connector 10 or slots 22 and 28 of decahedron connector 20. Engaging head 56 is being slidably inserted to within any of said slots in order to form a firm connection between the decahedron connectors and rods 50. The supporting rod can be straight or curved.

FIG. 3c illustrates an optional feature that correspond the slots shown in FIG. 2. A protrusion 58 is provided substantially in the center of the outer broad surface of engagement head 56. Protrusion 58 is adapted to be received within recess 30 shown in the slots of FIG. 2 in order to fix the positioning of engagement head 56 within the slots and prevent further sliding. Protrusion 58 is a resilient protrusion that can be partially or totally eliminated of the surface of the slot so as to avoid any disturbance to the sliding movement of the engagement head within the slots. The mechanism can be a spring that is provided below the protrusion having a protruded position as a default position or the protrusion itself can be made of a resilient material. Any other mechanism that prevents undesired sliding movements of the engagement head can be designed by a person skilled in the art and is covered by the scope of the present invention.

Figure 4:
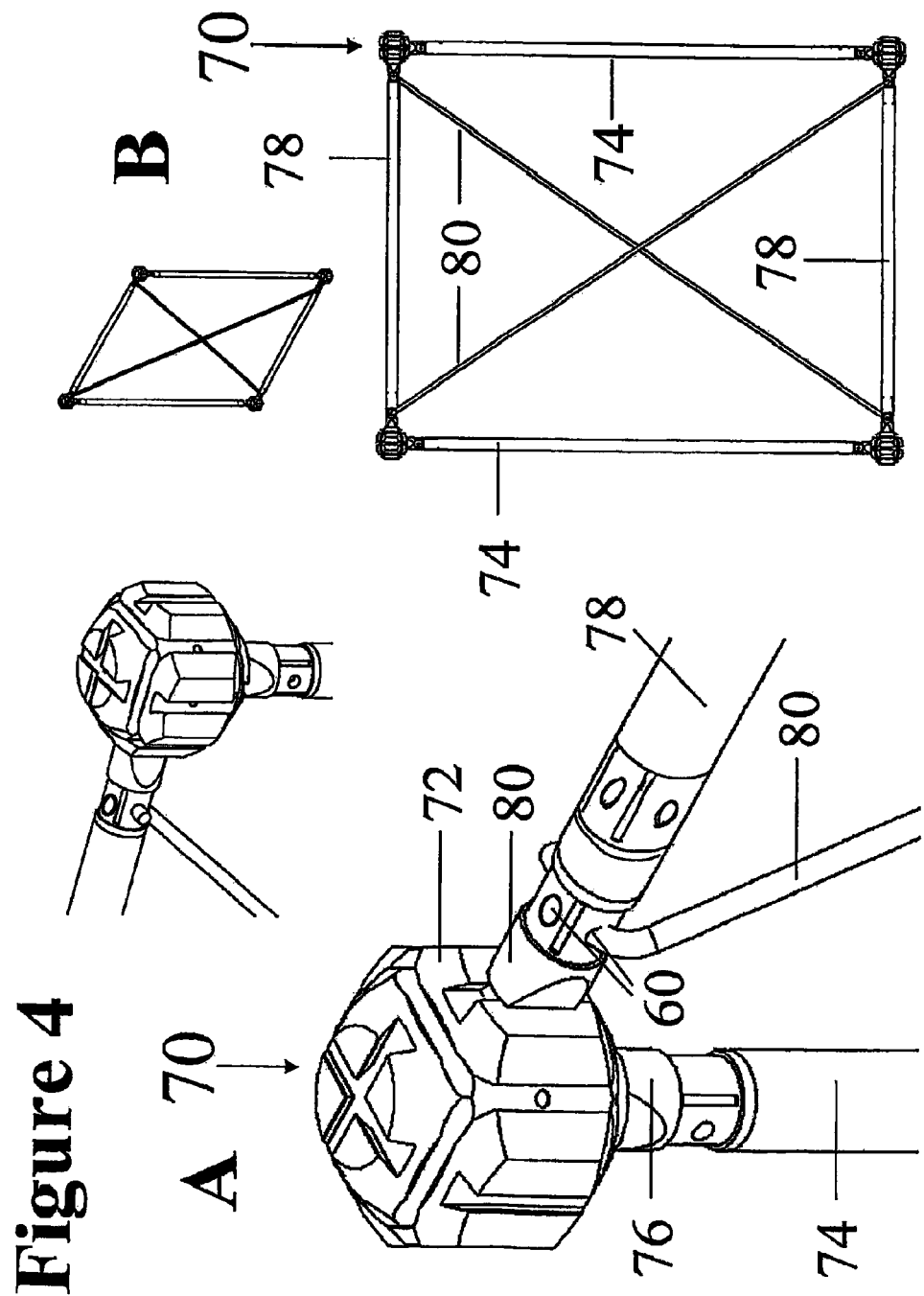
FIGS. 4a-b illustrate a construction in accordance with a preferred embodiment of the present invention.

Optionally, adjacent to engagement means 52, a hole 60 is provided. Hole 60 is adapted to receive a diagonal bar as will be shown herein after in FIG. 4.

Reference is now made to FIGS. 4a and b illustrating a construction in accordance with a preferred embodiment of the present invention. FIG. 4a illustrate a junction 70 of a frame that comprises a decahedron connector 72 to which two rods are connected through engagement means; a first rod 74 is connected to a bottom face of decahedron connector 72 through an engagement means 76, and a second rod 78 connected to one of the sides of decahedron connector 72 through an engagement means 80. This connection forms a 90 degrees angle between rod 74 and rod 78.

Using four junctions 70 and four rods 74 and 74', 78 and 78' form a rectangular frame as shown in FIG. 4b. In order to strengthen the frame, two diagonal bars 80 are connected to the frame. In order to allow two diagonal bars to crossover one another, diagonal bars 80 are connected to rod 78 through hole 60 that is provided on the side of rod 78. Each diagonal bar 80 is connected to the rods from another side of the frame so as to maintain a space between the diagonal bars and allow forming a frame having two diagonal bars. Any other detachable connecting mechanism between the diagonal bar and the engagement means can be designed and implemented.

It should be noted that the diagonal bar can be made of several parts that are interconnected so as to adjust the length of the bar to the construction. The adjustment of the bar's length is possible by means that are known in the art such as telescopic bars.

Figure 5:
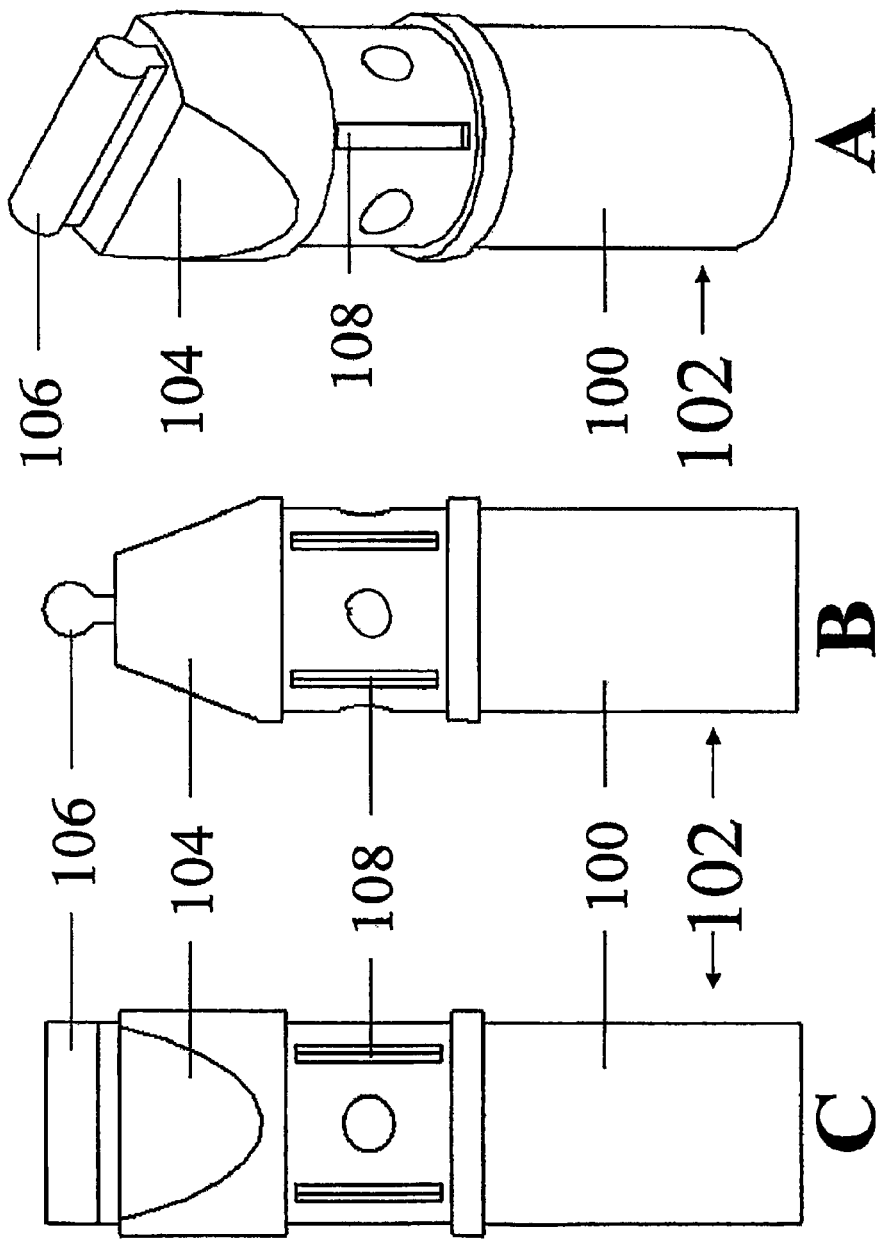
FIGS. 5a-c illustrate different views of a supporting rod's engagement means corresponding to a decahedron connector in accordance with another preferred embodiment of the present invention.

Reference is now made to FIG. 5 illustrating different views of a supporting rod's engagement means corresponding to a decahedron connector in accordance with another preferred embodiment of the present invention. FIG. 5a is an isometric view and FIGS. 5b and c are side views from different angles. As mentioned herein before, there are additional slots in decahedron connector 20 that renders more modularity to the construction that can be built out of the connecting elements of the present invention. Supporting rods 100 are preferably provided from both sides of the rod with engagement means 102. Engagement means 102 comprises a base 104 onto which an engaging head 106 is provided. Engaging head 106 has a profile that matches the profile of additional slots 32 of decahedron connector 20 shown in FIG. 2. Engaging head 106 is being slidably inserted to within one of slots 32 in order to form a firm connection between the decahedron connectors 20 and rods 100.

Figure 6:
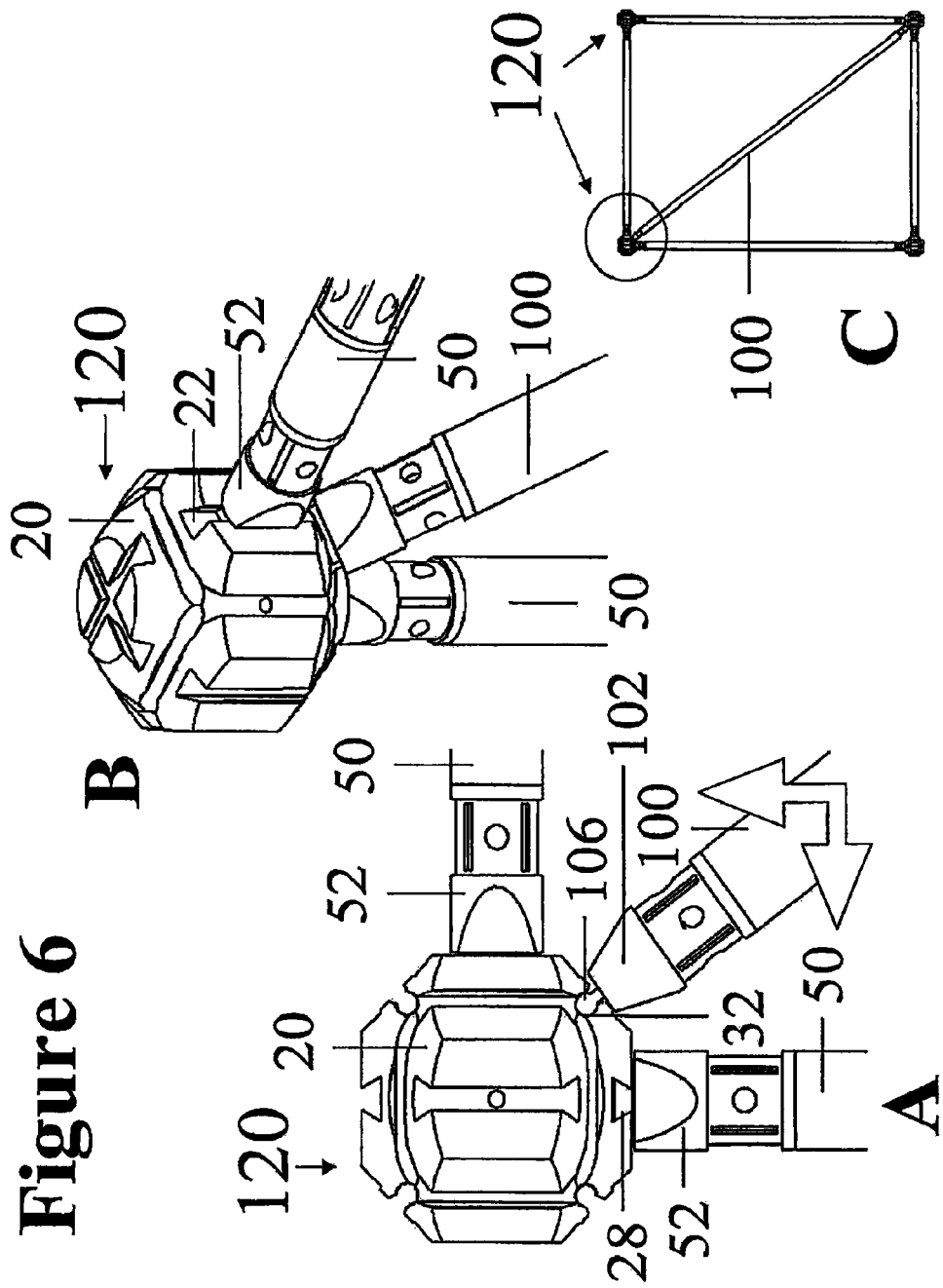
FIGS. 6a-b illustrate a construction of a frame in accordance with another preferred embodiment of the present invention.

Reference is now made to FIG. 6 illustrating a construction of a frame in accordance with another preferred embodiment of the present invention. FIGS. 6a and b illustrates different views of a junction 120 comprises a decahedron connector 20 to which three rods are connected: a first rod 50 is provided with an engaging means 52 that is engaged with slot 22; a second rod 50 is engaged through engaging means 52 to slot 28 of decahedron connector 20 so as to form a 90 degrees angle between the two rods. An additional rod 100 provided with engaging head 106 is slidably inserted to within slot 32 of decahedron connector 20. The positioning of rod 100 in slot 32 that is between the side of the connector and its face form an angle between rod 100 and either one of rods 50. Since the specific slot profile shown herein is rounded, the diagonal rod can be moved to form any desired angle between the diagonal rod and the other rods that are connected to the faces or sides of the decahedron connector. FIG. 6c illustrates a construction that can be made of both junctions 70 and junctions 120. Diagonal rod 100 can be added in order to render stability and strength to the frame.

Addition of diagonal rods to the structures of the present invention can allow formation of triangular structures that add further modularity and versatility to the constructions made of the connecting elements of the present invention.

Optionally, fixed junctions are available.

Figure 7:
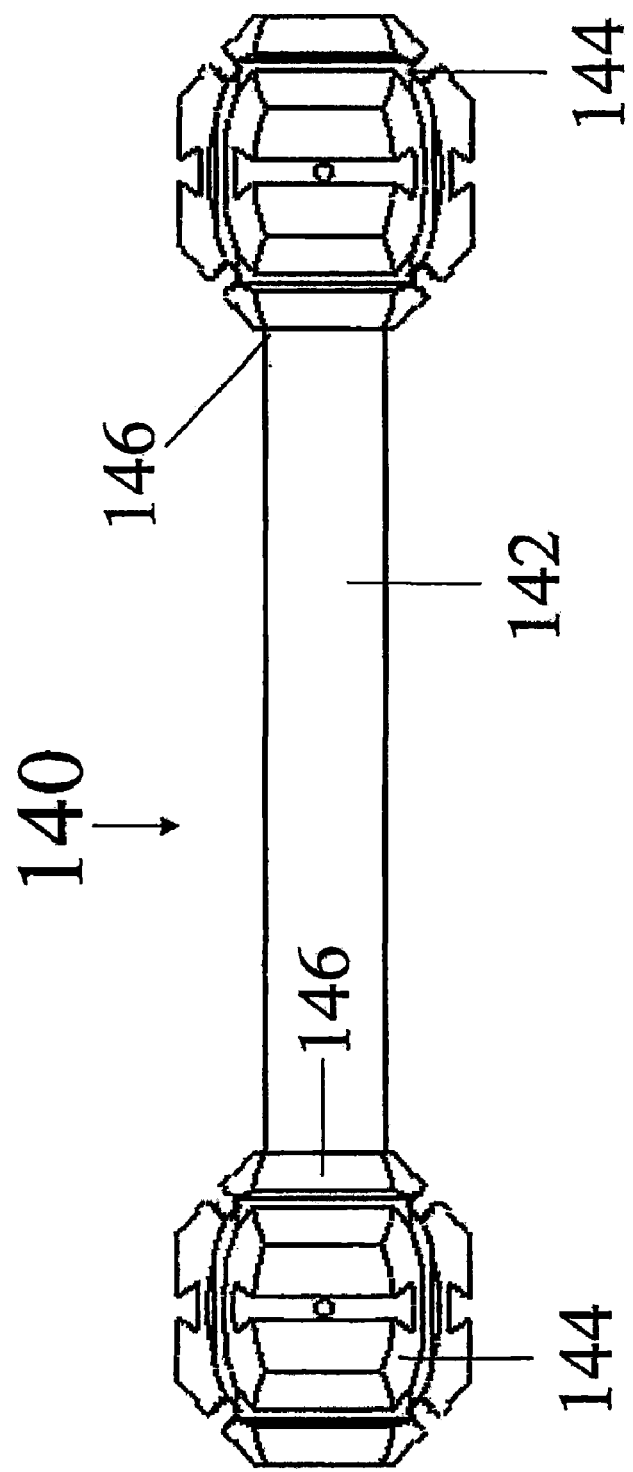
FIG. 7 illustrates a fixed connection of a supporting rod and a connector in accordance with a preferred embodiment of the present invention.

Reference is now made to FIG. 7 illustrating a fixed connection of a supporting rod and a connector in accordance with a preferred embodiment of the present invention. Connecting element 140 is brought herein as an exemplary embodiment; however, other fixed connecting elements can be established accordingly and are covered by the scope of the present invention. Connecting element 140 is provided with a rod 142 and two decahedron connectors 144 wherein each of the decahedron connectors is provided with a side 146 that is fixed to rod 142. These types of connectors can facilitate constructing the construction.

Returning to FIG. 3 and FIG. 5, optionally, rod 50 and rod 100 are provided with at least one set of preferably four slots 62 and 108 respectively that are directed along the elongated dimension of the rods. The four slots are preferably arranged to be positioned in an angle of 90 degrees one from the other. The slots are adapted to facilitate the connection and direction of a wing connecting member.

Figure 8:
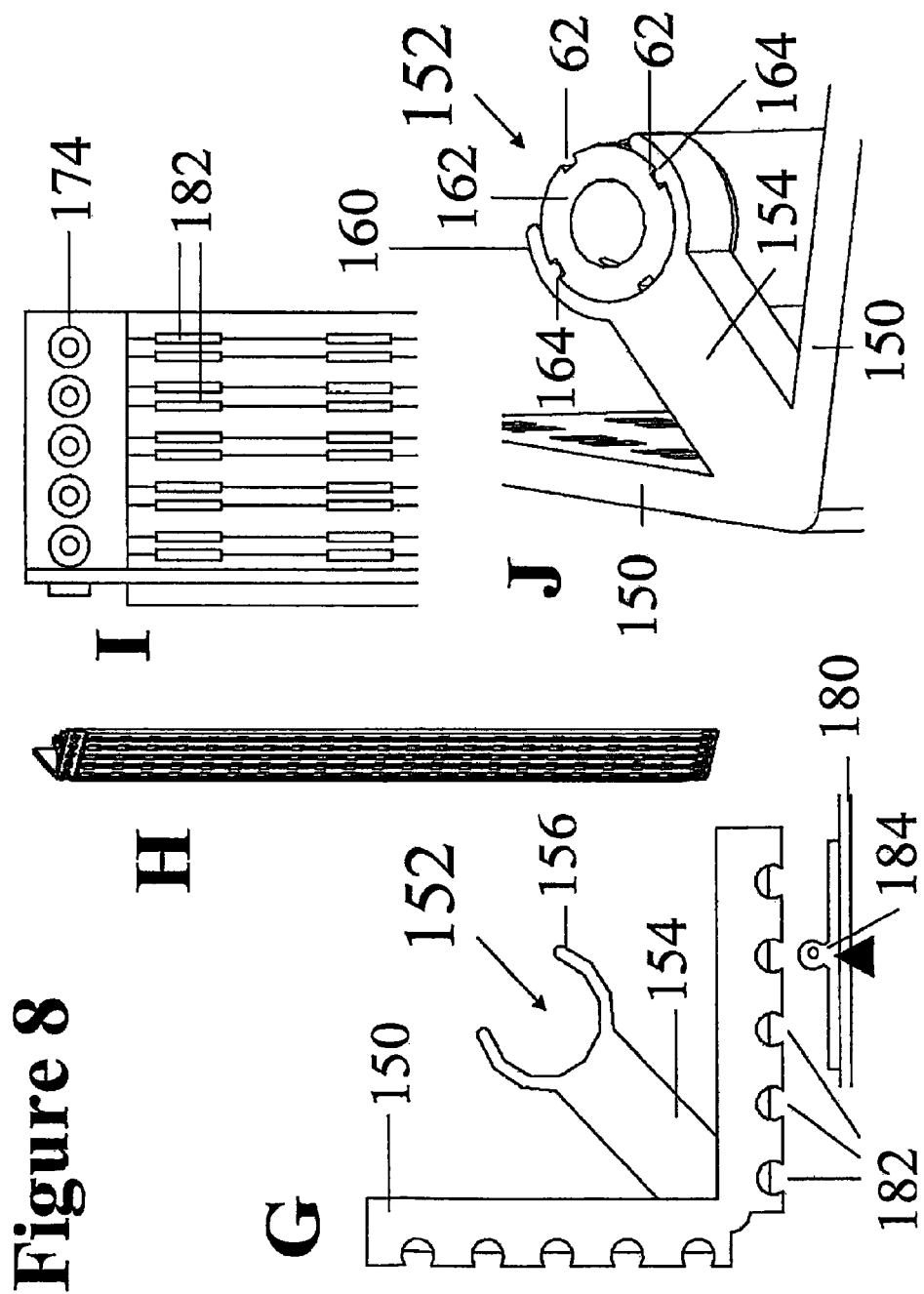
FIGS. 8a-j illustrate different options for a wing connecting member in accordance with a preferred embodiment of the present invention, and a view of a wing connecting member axially wrapped around a supporting rod.

Reference is now made to FIG. 8 illustrating different options for a wing connecting member in accordance with a preferred embodiment of the present invention, and a view of a wing connecting member axially wrapped around a supporting rod. Each wing connecting member of the constructing elements of the present invention is adapted to support a panel onto which media is provided in an exhibition, for example; however, the panel can be used for other purposes as well. In this description, the word panel is referred to a material deployed onto the construction. The panel can be made from any material such as PVC, paper, fabric, plastic, rubber, or any other flexible or rigid material.

In order to hold the panels onto the construction that are being formed of the supporting rods and the connectors, the supporting rods can be provided with elongated wings that are positioned along the rod. Wing connecting members are shown in FIGS. 8a, b, c and h. A wing connecting member comprises a surface 150 that can be straight, angled, or curved (will be shown in FIG. 10). It is possible to provide a hinge in the wing between two separate surfaces so as to establish a wing with more possibilities to form angular structures. Wing 150 is an elongated structure that is long enough to extend along a supporting rod. At least one gripper 152 is provided to wing 150 adapted to grip the rod in order to connect the wing to the rod.

FIG. 8g illustrates a top view of a wing connecting member. Wing 150 has two surfaces that are perpendicular to one another while gripper 152 is provided between them. Gripper 152 comprises an arm 154 that is connected on one end to the connection zone between the wing's surfaces and is provided with a grip 156 on the free end. Grip 156 is adapted to wrap around the rod in a detachable connection. In order to better understand the connection between the rod and the gripper, a cross sectional view of the gripper and the rod is depicted in FIG. 8j. Wing 150 is provided with a grip 160 that is connected to a rod 162. In order to establish a firm connection between the rod and the grip, rod 162 is being forcibly pressed to within grip 160.

Optionally and in accordance with a preferred embodiment of the present invention, grip 160 is provided with plurality but preferably three protrusions 164 that are protruding towards the rod. As mentioned herein before, the rods are provided with four slots preferably in the vicinity of the engagement means wherein the slots (slots 62 or 108) can be provided also in other places along the rod. Protrusions 164 correspond to slots 62 so that when the rod 162 is being pressed into grip 160, protrusions 164 are inserted to within slots 62 so as to prevent rotational movement of the rod within the grip and render stability to the connection. Intentional rotational movements can be made while building up the construction; however, when the desired angular direction is established, there will be no rotational movements. Optionally, slots 62 or 108 are provided in a recess in the rod so as to prevent movement of the grip along the rod.

The surfaces of wing 150 themselves are provided with means of attaching a panel that is preferably flexible. Several examples are given herein in FIGS. 8d, e, f, and i that are enlarged views of FIGS. 8a, b, c and h, respectively. The wing's surface can optionally be provided with patches made of Velcro or magnetic material or any other connecting material. The upper and lower ends of wings 150 are provided with connecting means that are more dominant such as slots 172 (FIG. 8d), magnets 174 (FIGS. 8e and i), sliding connection 176 (FIG. 8f), or any other facilitating connection adapted to connect a panel to the wing. The panel will be incorporated with a corresponding mechanism, magnet, Velcro etc. Any combination of the connecting mechanism can be implemented.

A unique method of connecting a panel 180 to a wing 150 is shown in FIG. 8g in which the wings are provided with groups of stiff elongated recesses 182 (shown also in FIG. 8i) while panel 180 is provided with corresponding elongated protrusions 184. The panel is adapted to be pushed against the wing so that protrusions 184 are inserted to within recesses 182 while the recesses are holding the panel adjacent to the wing. Preferably protrusions 184 are made of a resilient material that enables an easy insertion of the protrusion to the recesses. This mechanism operates similarly to ziplock mechanism.

In case a magnet patches are adhered on the panels in order to establish a connection between the panel and the wing, part of the wing is preferable made of metallic material.

Optionally and in order to render additional strength and stability to the panels, a strip can be added between the wings so as to support the panels that will be connected to the strip as well. The strip can be mounted on the upper end of the wings or on top of the wings. In this way, the panels can be moved along the strip.

Figure 9:
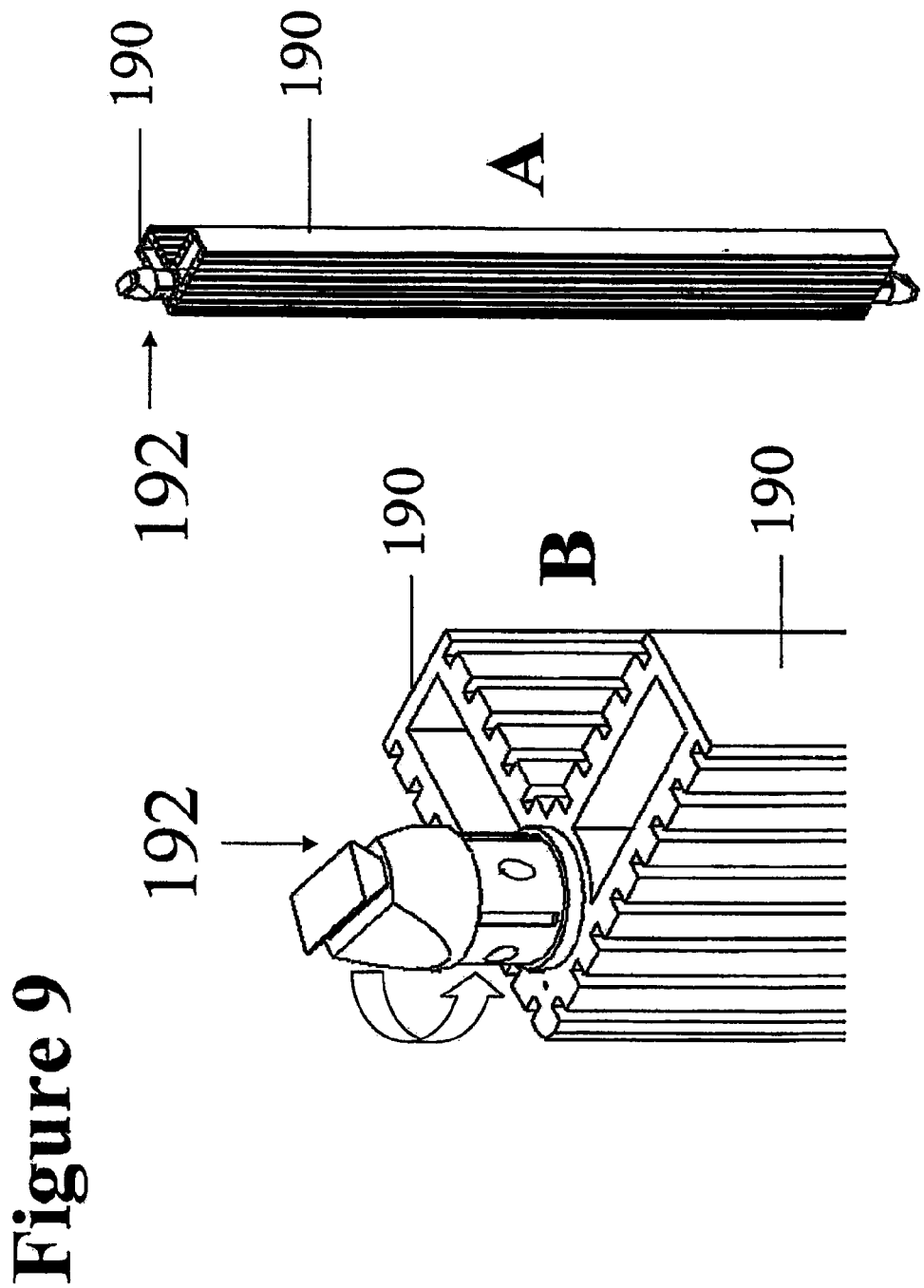
FIGS. 9a-b illustrate a wing connecting means incorporated with a supporting rod's end in accordance with a preferred embodiment of the present invention.

Reference is now made to FIG. 9 illustrating a wing connecting means incorporated with a supporting rod's end in accordance with a preferred embodiment of the present invention. Optionally, it is provided a combined supporting rod and wing connecting member. Wing 190 is made broader and more massive so that they can act also as a supporting rod. A rotational engagement means 192 is provided between wings 190 so as to allow its connection to a connector such as a decahedron connector in a similar manner as used in the engagement means shown herein before.

Figure 10:
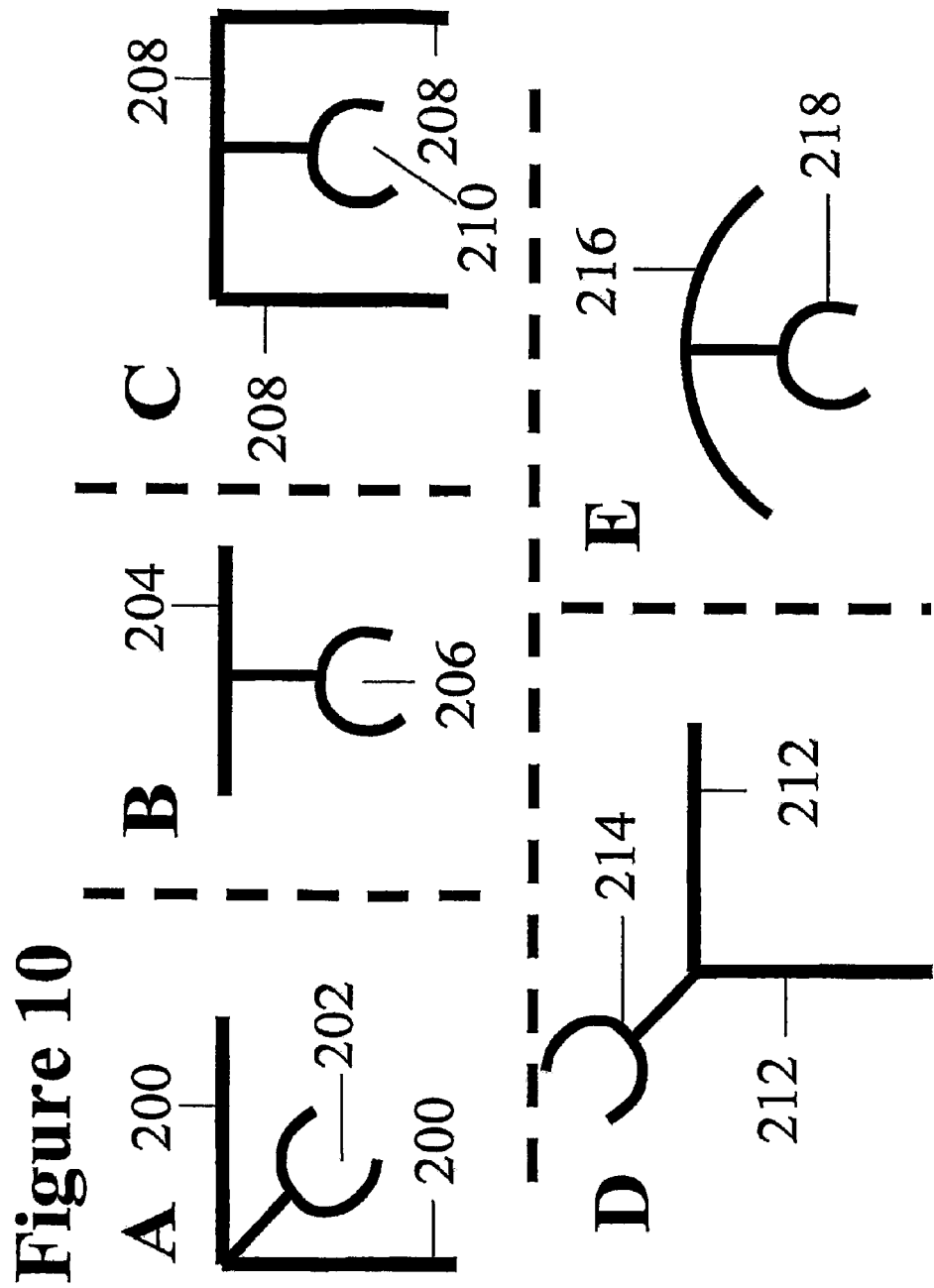
FIGS. 10a-d illustrate profiles of optional wing connecting members in accordance with a preferred embodiment of the present invention.

Reference is now made to FIG. 10 illustrating profiles of optional wing connecting members in accordance with a preferred embodiment of the present invention. A wing 200 made of two angled surfaces is shown in FIG. 10a while gripper 202 is between them. This establishes substantially a 90 degrees angle between panels. FIG. 10b illustrates a connection by which one surface 204 is provided with a gripper 206. A three face corner is shown in FIG. 10c wherein wing 208 is arranged substantially in a U shape while gripper 210 is between the surfaces. FIG. 10d depicts an angular surface's wing 212 similar to wing 200 while gripper 214 is outwardly positioned. A curved wing 216 can be also provided with a gripper 218 in an inward position such as the one shown in the figure or in an outward position. Other possibilities can be established by a person skilled in the art and are covered by the scope of the present invention.

Figure 11:
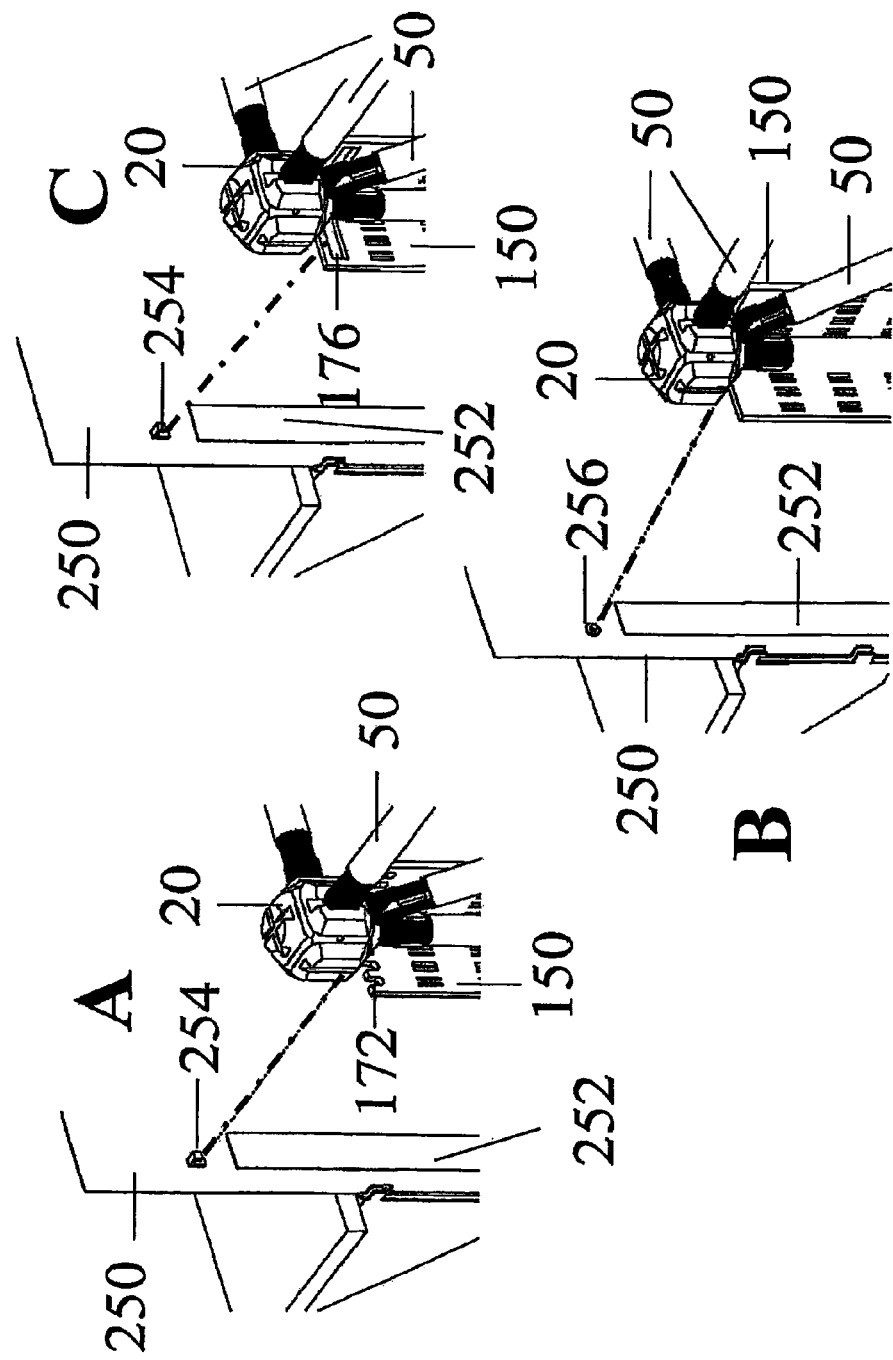
FIGS. 11a-c illustrate options for suspending a panel on a construction in accordance with preferred embodiments of the present invention.

Reference is now made to FIG. 11 illustrating options for suspending a panel on a construction in accordance with preferred embodiments of the present invention. As mentioned herein before, a panel adapted for media in an exemplary embodiment is connected to the construction through the wings. FIG. 11a depicts a junction comprising decahedron 20 to which several rods 50 are connected. Wing connecting member 150 is provided on one of the rods so that a media panel 250 can be adhered onto wing 150. Wing 150 is provided preferably with magnetic strips (not shown in the figure) that are adapted to contiguously attach media panel 250 through corresponding magnetic patches 252. A flange 254 is provided to media panel 250 so as to maintain a stable connection between wing 150 and the panel itself.

FIG. 11b illustrates similar construction wherein wing 150 is provided with magnetic connection wherein magnetic buttons such as the connectors shown in FIG. 8e are present. An opposite magnet 256 is provided onto media panel 250 in a corresponding place so as to firmly connect the media panel to the wing.

FIG. 11c illustrates similar construction in which a slide 176 is provided in wing 150 and flange 254 of media panel 250 is suspending onto slide 176.

Figure 12:
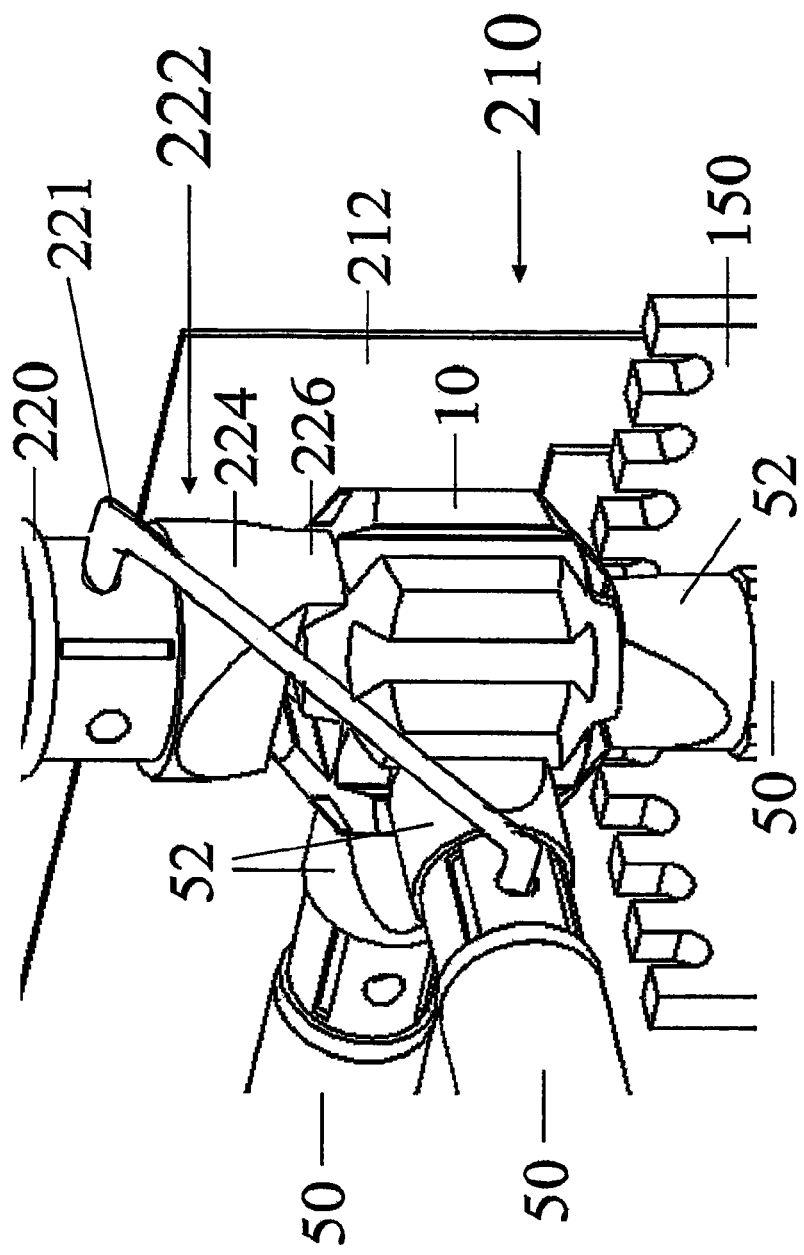
FIG. 12 illustrates a junction between connecting members in accordance with a preferred embodiment of the present invention connected to a supporting rod in accordance with another preferred embodiment of the present invention.

Reference is now made to FIG. 12 illustrating a junction between connecting members in accordance with a preferred embodiment of the present invention connected to a supporting rod in accordance with another preferred embodiment of the present invention. A junction 210 in a construction comprises a decahedron connector 10, three rods 50 that are connected to different sides of decahedron connector 10 through engagement means 52. Wing connecting member 150 to which a panel 212 is connected to wing connecting member. An additional rod 220 is provided wherein rod 220 is provided with an engagement means 222. A base 224 is provided with a stopper 226 that is adapted to lock the sliding of the engagement head within the slot of the decahedron connector from one of its sides.

A stopper can be implemented in a similar manner in the decahedron connector itself so as to establish one way insertion or withdrawal of the engagement head.

It should be mentioned that the diagonal bar shown herein before can be used in different manners such as strengthening the construction. An example of a bar 221 for strengthening junction 210 is shown.

Figure 13:
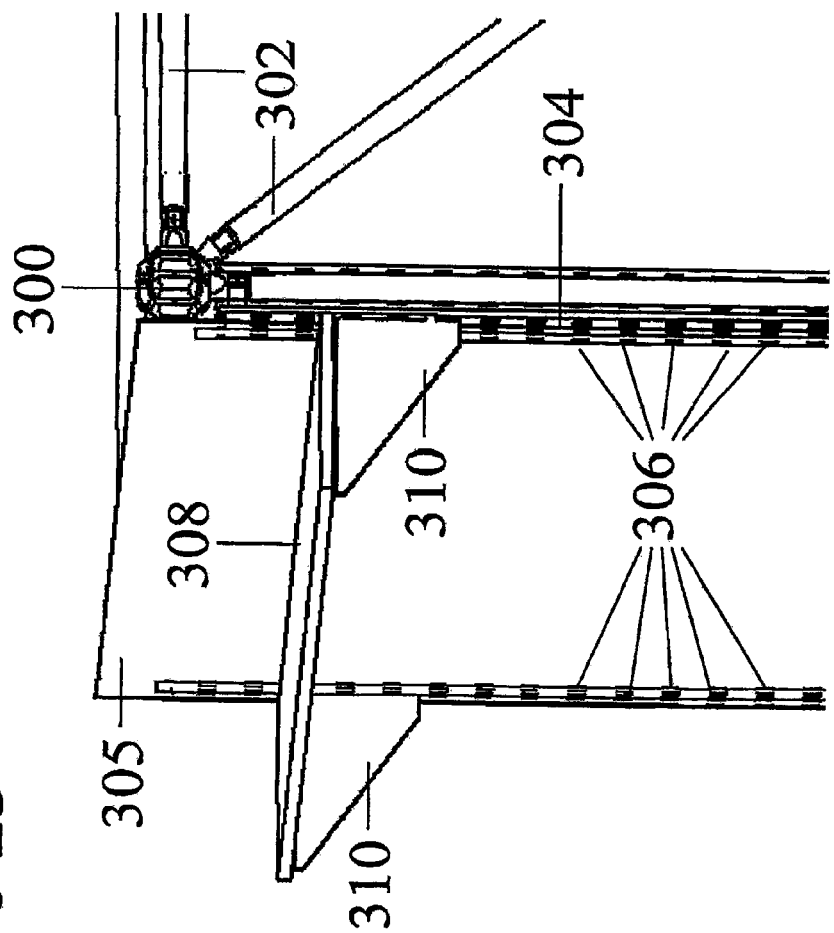
FIG. 13 illustrates a shelf construction in accordance with a preferred embodiment of the present invention.

Reference is now made to FIG. 13 illustrating a shelf construction in accordance with a preferred embodiment of the present invention. A construction is shown to comprise decahedron connectors 300, supporting rods 302, wing connecting members 304 and a panel 305 attached in the formed construction. Optionally, wing connecting members 304 are provided with a plurality of slits 306 arranged preferably in rows along the wings. A shelf 308 can be installed on two holders 310 that are adapted to be suspended on the wing through slits 306. The shelves can be placed in any position on the construction.

Figure 14:
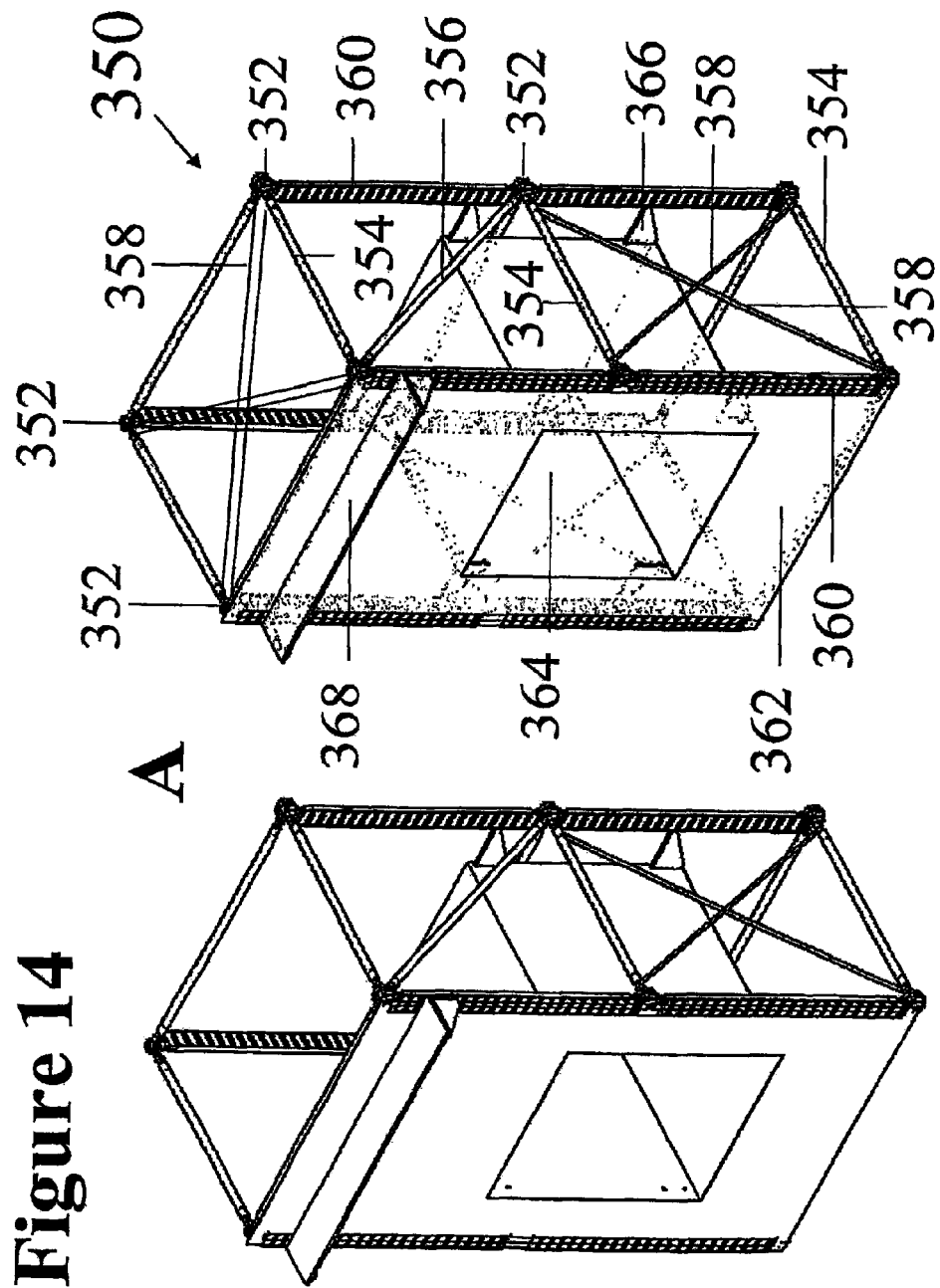
FIGS. 14a,b illustrate a frontal and rear views of an optional construction in accordance with a preferred embodiment of the present invention.
Figure 14:
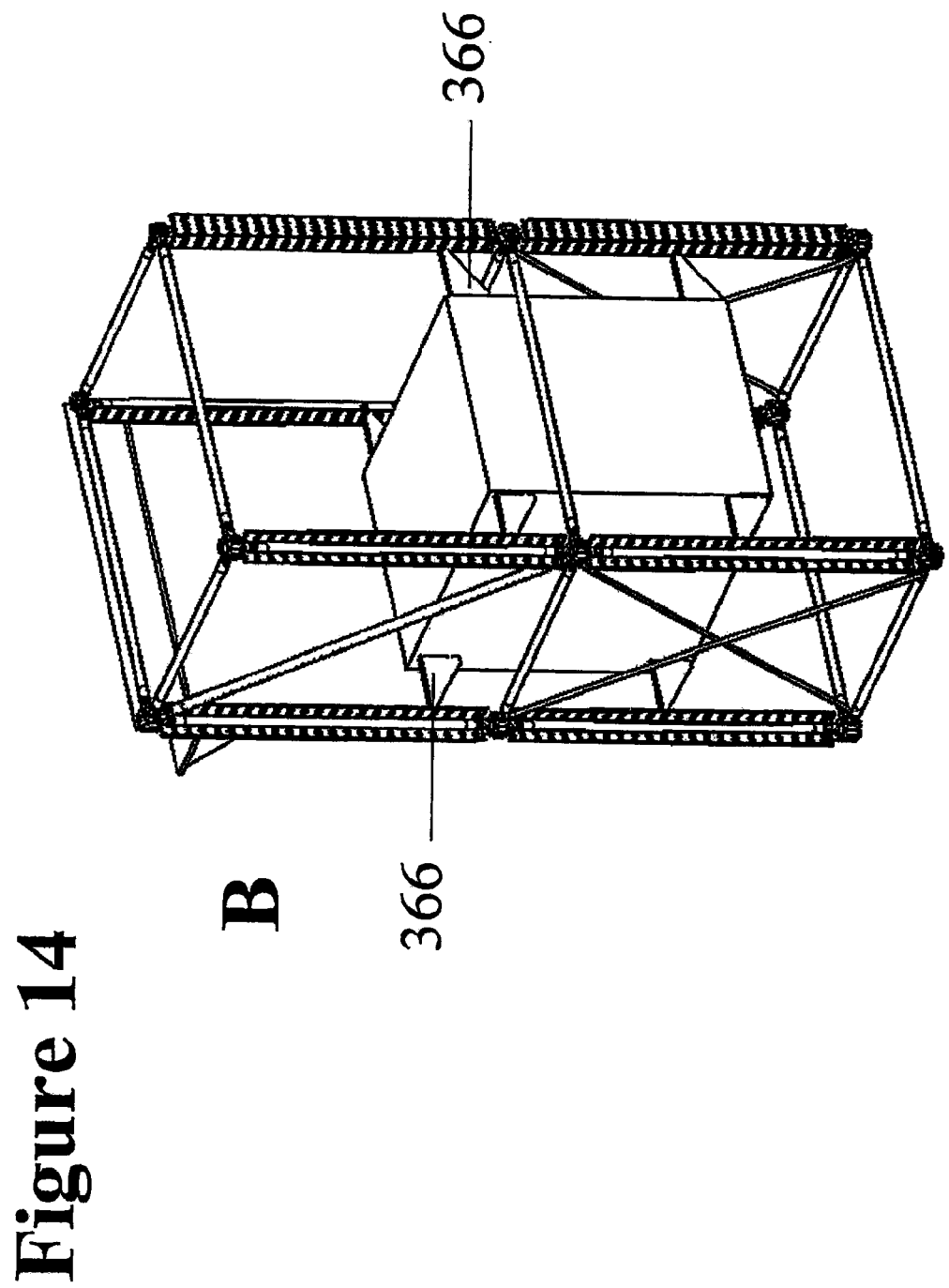

Reference is now made to FIG. 14 illustrating a frontal and rear view of an optional construction in accordance with a preferred embodiment of the present invention. Construction 350 is built of the building blocks of the connecting elements of the present invention that are a plurality of decahedron connectors 352 connecting a plurality of supporting rods 354. In order to strengthen construction 350, additional diagonal rod 356 is provided. Optionally, diagonal rods 358 are provided to render strength to construction 350. Wing connecting elements 360 are provided and wrapped around some of the supporting rods. A panel 362 is attached using one of the methods illustrated herein to one of the frames constructed from oppositely positioned wings.

Optionally, a niche 364 can be added while in the rear view of the construction (FIG. 14*b*), one can observe a plurality of holders 366 adapted to support a box forming niche 364 the niche can be formed in any size or shape.

Optionally, a shelf 368 can be held in any place and height between the wings.

Figure 15:
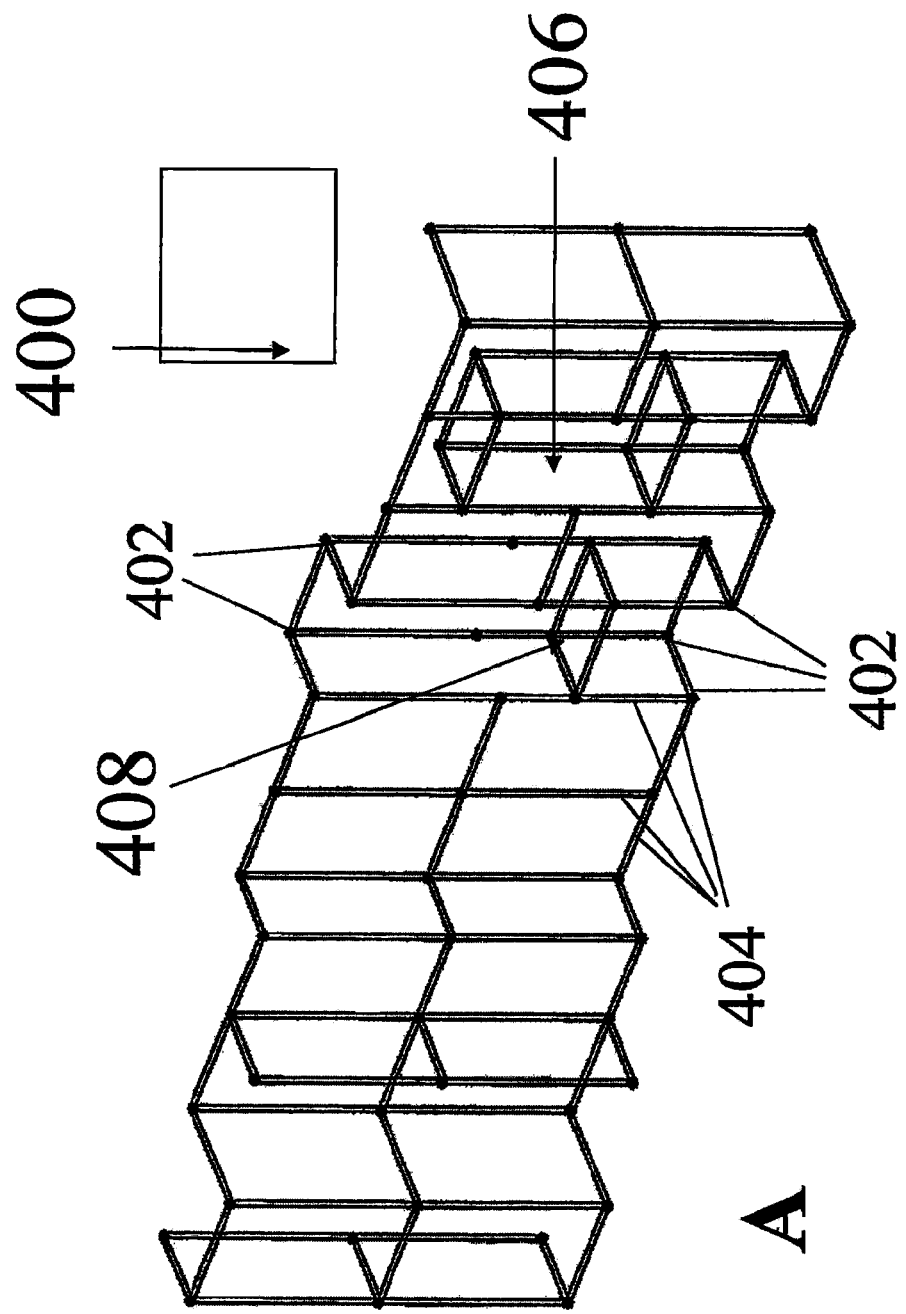
FIGS. 15a-c illustrate different views of a construction with a constructed niche in accordance with a preferred embodiment of the present invention.
Figure 15:
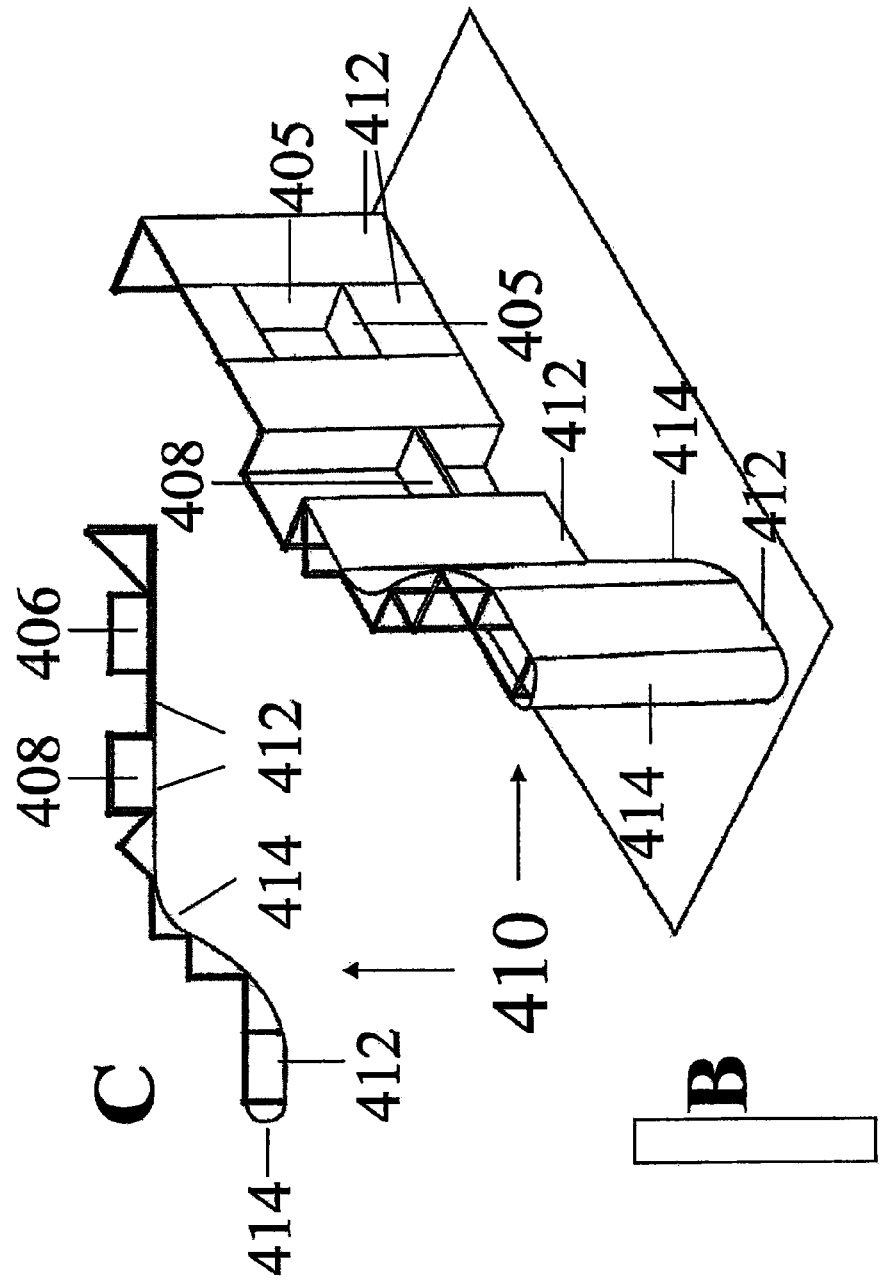

Reference is now made to FIG. 15 illustrating different views of a construction with a constructed niche in accordance with a preferred embodiment of the present invention. A full exemplary construction is shown in FIG. 15 wherein a depicts the construction made of the connecting elements of the present invention, b depicts an isometric view of the construction shown in a, after panels are suspended, and c illustrates a top view of the construction. Construction 400 comprises a plurality of decahedron connectors 402 and supporting rods 404 that are arranged in order to build up a construction. A constructed niche 406 is built also of decahedron connectors and supporting rods similarly to other portions of the construction. Similarly and optionally, a constructed table or shelf 408 can be prepared from the same building blocks of the present invention.

In FIGS. 15*b* and *c*, the construction can be observed after panels 412 are suspended on wings that are being connected to the rods (the wings are not shown in the figure). The panels can be arranged in different arrangement in order to form a versatile and interesting construction. As an example, flexible panels 414 that are suspended in a curved shape are shown. Panels 405 are arranged to form constructed niche 406 and a rigid panel 408 form a table.

In accordance with another aspect of the present invention, modular furniture can be constructed. In constructing complex construction it is needed to form shapes using different sizes and measurements of the connecting elements as well as the connectors that can be used in different proportions.

Figure 16:
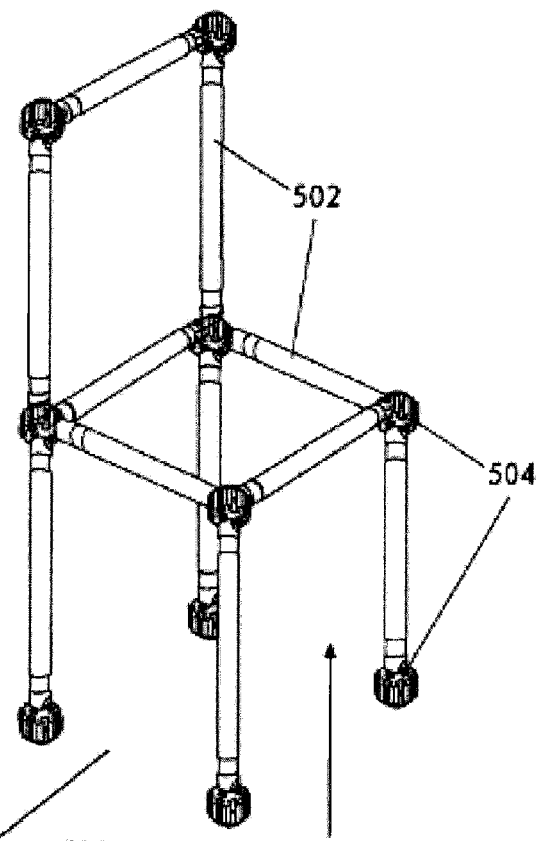
FIG. 16 illustrate a modular chair constructed from connecting rods and connectors in accordance with the present invention.
Figure 17:
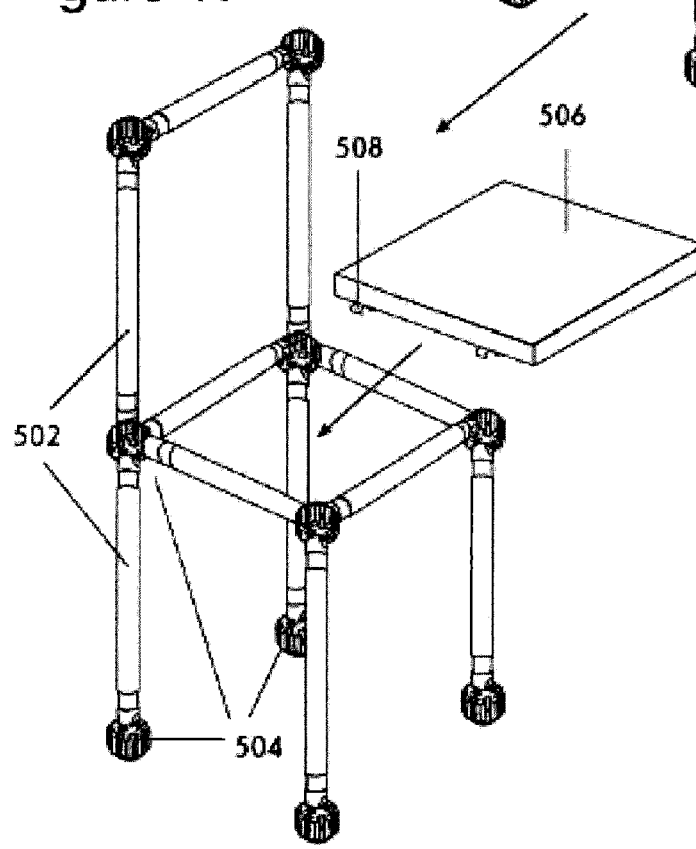
FIG. 17 illustrates the modular chair shown in FIG. 16 provided with a seat shaped wing.

Reference is now made to FIGS. 16 and 17 illustrating a modular chair constructed from connecting rods and connectors and with a seat shaped wing, respectively in accordance with the present invention. A basic chair structure 500 is constructed using connecting rods 502 and intermediate connectors 504. The engagement between the connecting head of the connecting rods and the connectors is based on the same principles that were illustrated and explained herein before—an engagement head is connected to the connector through a slot.

In FIG. 17, a seat 506 is placed in its place and connected using grippers 508 that are enclosing onto connecting rods 502 that are arranged in a rectangular. The connection between the grippers and the connecting rods is similar in principle to the connection established between the wing-like structure shown herein before and the connecting rods that establishes the exhibition.

It should be mentioned that the structures formed by the connecting elements of the present invention are stable enough to act as furniture that bears substantial load.

Figure 18:
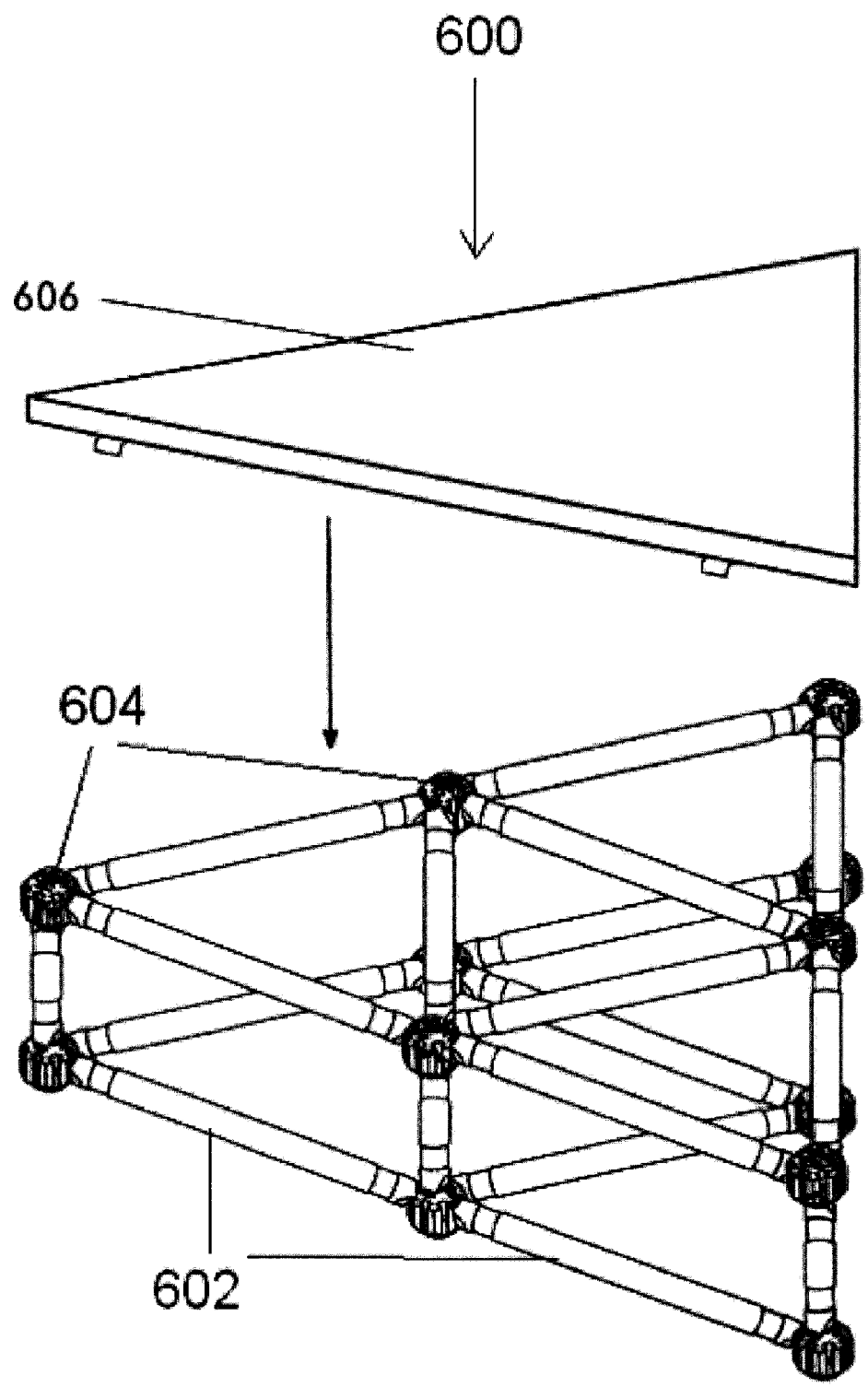
FIG. 18 illustrates a platform suitable for performances or presentations in accordance with a preferred embodiment of the present invention.

Reference is now made to FIG. 18 illustrating a platform suitable for performances or presentations in accordance with a preferred embodiment of the present invention. Platform 600 is built of connecting rods 602 in different lengths as well as connectors 604 that establish junctions between the rods. Wing-like elements 606 are gripped using grippers to the connecting rods.

The structures can also establish different shaped constructions that can be used for marketing purposes, displays etc.

Figure 19:
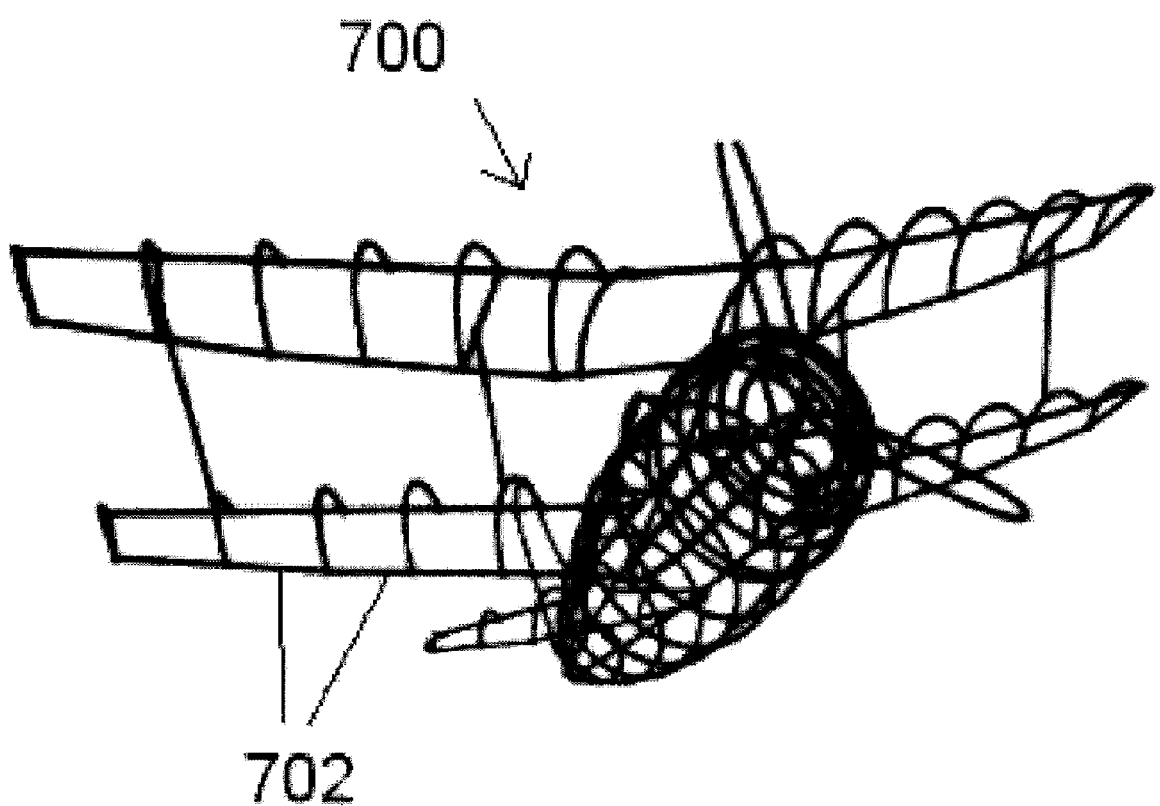
FIG. 19 illustrates a modular construction shaped as an airplane in accordance with a preferred embodiment of the present invention.

Reference is now made to FIG. 19 illustrating a modular construction shaped as an airplane in accordance with a preferred embodiment of the present invention. Airplane 700 is constructed brim connecting rods 702 and connectors 704 that are in different shapes and sized in order to establish the complex structure needed.

It should be clear that the description of the embodiments and attached Figures set forth in this specification serves only for a better understanding of the invention, without limiting its scope as covered by the following Claims.

It should also be clear that a person skilled in the art, after reading the present specification can make adjustments or amendments to the attached Figures and above described embodiments that would still be covered by the following Claims.

The invention claimed is:

1. A mobile and versatile exhibition construction comprising:
   a plurality of connecting rods having two ends wherein an engagement means is provided to at least one of said two ends and wherein said engagement means is provided with an engagement head;
   a plurality of connectors having plurality of substantially flat faces, arranged laterally and perpendicularly, and the lateral faces have a larger surface than the surface of any of the perpendicular faces, wherein each of said plurality of substantially flat faces is provided with a slot having two opposite openings and an elongated opening wherein said engagement head is adapted to move solely in sliding movements within said slot and wherein said engagement head cannot pass through said elongated opening;
   a plurality of wing connecting members comprises at least one elongated flat surface and at least one connected gripper adapted to longitudinally grip along side one of said plurality of connecting rods; and
   a plurality of panels adapted to contiguously connect to said plurality of wing connecting members so that adjacent panels establish a continuous surface capable of hiding the rods, the connectors and the wings.

2. The exhibition construction as claimed in claim 1, wherein said connector is a decahedron provided with eight slots on the perpendicular sides, and two crossed slots on each lateral side.

3. The exhibition construction as claimed in claim 1, wherein said slot and said engagement head are provided with fixer adapted to fix the positioning of said engagement head within said slot so as to prevent undesired sliding movements within said slot.

4. The exhibition construction as claimed in claim 1, wherein said at least one elongated surface is provided with suspending means allowing to suspend one of said plurality of panels on said wing connecting member.

5. The exhibition construction as claimed in claim 1, wherein said at least one elongated surface is provided with attaching means adapted to attach said plurality of panels to said at least one elongated surface.

6. The exhibition construction as claimed in claim 1, wherein said at least one elongated surface is provided with at least one slit adapted to receive a holder.

7. The exhibition construction as claimed in claim 1, wherein said gripper and said connecting rod are provided with a rotation prevention mechanism.

8. The exhibition construction as claimed in claim 1, wherein said gripper is provided with protrusions adapted to be received in recesses provided on said plurality of connecting rods.

9. The exhibition construction as claimed in claim 1, wherein the connecting rod is incorporated in the wing connecting member.

10. The exhibition construction as claimed in claim 1, wherein said engagement head is rotational.

11. The exhibition as claimed in claim 1, wherein said continuous surface can establish a corner.

* * * * *